(12) United States Patent
Specht et al.

(10) Patent No.: US 10,043,601 B2
(45) Date of Patent: Aug. 7, 2018

(54) SHEATHING OF PROFILES WITH LATERAL DISPOSALS

(71) Applicants: Alanod GmbH & Co. KG, Ennepetal (DE); Lisa Draexlmaier GmbH, Vilsbiburg (DE)

(72) Inventors: Klaus Specht, Gelsenhausen (DE); Harald Sommavilla, St. Peter (AT); Christian Heigl, Niederwinkling (DE); Dirk Reissenweber, Ebersdorf (DE); Peter Steer, München (DE)

(73) Assignees: Lisa Draexlmaier GmbH, Vilsbiburg (DE); Alanod GmbH & Co. KG, Egerstresse (DE)

( * ) Notice: Subject to any disclaimer, the term of this patent is extended or adjusted under 35 U.S.C. 154(b) by 459 days.

(21) Appl. No.: 14/670,960

(22) Filed: Mar. 27, 2015

(65) Prior Publication Data

US 2015/0325340 A1 Nov. 12, 2015

(30) Foreign Application Priority Data

Mar. 27, 2014 (DE) .................. 10 2014 004 431

(51) Int. Cl.
| | |
|---|---|
| B29C 47/00 | (2006.01) |
| B29C 47/02 | (2006.01) |
| B29C 47/06 | (2006.01) |
| B29C 47/12 | (2006.01) |
| B29C 47/14 | (2006.01) |
| B29C 47/26 | (2006.01) |
| B29L 31/34 | (2006.01) |
| H01B 13/14 | (2006.01) |
| H01B 13/18 | (2006.01) |
| H01B 13/24 | (2006.01) |

(52) U.S. Cl.
CPC ........... *H01B 13/143* (2013.01); *H01B 13/14* (2013.01); *H01B 13/146* (2013.01); *H01B 13/18* (2013.01); *H01B 13/24* (2013.01); *B29C 47/003* (2013.01); *B29C 47/0019* (2013.01); *B29C 47/0023* (2013.01); *B29C 47/025* (2013.01); *B29C 47/062* (2013.01); *B29C 47/065* (2013.01); *B29C 47/128* (2013.01); *B29C 47/145* (2013.01); *B29C 47/26* (2013.01); *B29L 2031/3462* (2013.01); *Y10T 428/31678* (2015.04)

(58) Field of Classification Search
CPC .... H01B 13/143; H01B 13/146; H01B 13/18; H01B 13/24; H01B 13/14; Y10T 428/31678; B29C 47/0019; B29C 47/0023; B29C 47/003; B29C 47/025; B29C 47/062; B29C 47/065; B29C 47/128; B29C 47/145; B29C 47/26; B29L 2031/3462
See application file for complete search history.

(56) References Cited

U.S. PATENT DOCUMENTS

| | | | | |
|---|---|---|---|---|
| 3,960,622 | A * | 6/1976 | Hofling et al. | .......... H01B 7/08 156/244.25 |
| 6,446,938 | B1 * | 9/2002 | Hadfield, Sr. | ........... E06B 11/02 256/19 |
| 2004/0188876 | A1 * | 9/2004 | Baumann | ............ B29C 47/0014 264/40.1 |

FOREIGN PATENT DOCUMENTS

| | | |
|---|---|---|
| DE | 3936795 | 5/1991 |
| DE | 20307562 | 8/2003 |
| DE | 102012217618 | 3/2014 |
| EP | 1453067 | 9/2004 |

OTHER PUBLICATIONS

Office Action dated Oct. 14, 2014 for German Patent Application No. 10 2014 004 431.9 dated Mar. 27, 2014.

\* cited by examiner

*Primary Examiner* — Patrick D Niland
(74) *Attorney, Agent, or Firm* — Finnegan, Henderson, Farabow, Garrett & Dunner LLP

(57) ABSTRACT

A sheathed elongated profile, that is, shaped product, is disclosed. The elongated profile may include a main profile body that is at least partially sheathed in a first synthetics component. The elongated profile may also include at least one disposal, that is, protrusion, on the main profile body that is not completely sheathed in the first synthetics component and at least partially sheathed in a second synthetics component. Methods and devices for producing the elongated profile are also disclosed.

12 Claims, 26 Drawing Sheets

SHEATHING OF PROFILES WITH LATERAL DISPOSALS

CROSS-REFERENCE TO RELATED APPLICATION

This application is based upon and claims the benefit of prior German Application No. 10 2014 0004 431.9, filed on Mar. 27, 2014, the entire contents of which are incorporated herein by reference.

TECHNICAL FIELD

This disclosure relates a method for sheathing profiles with lateral disposals, that is, shaped products with lateral protrusions, such as flat conductors, for use in the automotive field, and a device for sheathing a profile as well as a sheathed profile.

BACKGROUND

DE 39 36 795 A1 describes a method for extruding tubular-shaped products, more specifically for stabilizing extruded tubular-shaped products, to provide a conductor that runs into an injection head of an extruder with an insulating sheath. The sheathing of flat conductors by means of extrusion is discussed in DE 203 07 562 U1 and EP 1 453 067 A1.

In existing products, the profiles to be sheathed are primarily electrical conductors that are provided with a synthetic material insulation using an extrusion process. The extruded profile may be coined, punched, bent, cut or otherwise reworked. Until now, any laterally protruding shapes that are attached to the extruded profile may be welded on, glued on, screwed on, or attached in another way, using additional work steps. For example, the sheathed synthetic material may be removed, (e.g. the sheath is partially or completely milled down), and the attachment may be made using a welding process, for example. Then, after a cleaning process, another final partial or complete sheathing may be added. However, the resulting sheathing consists of two pieces.

In the production of a sheathed profile with lateral disposals, all of these additional steps are disadvantageous in terms of cost and cycle times. In the case of long profiles having continuous or discontinuous lateral disposals, for example, with flat conductor cable harnesses in automotive engineering, reworking takes time and is cost-intensive. This applies to components with high piece numbers and reworking techniques such as spray-painting or dip painting.

SUMMARY

One object of the disclosure is to provide a method and a device for the production of a sheathed profile with lateral disposals, as well as a profile of this type, which are suitable to reduce the reworking effort.

In an exemplary embodiment, an elongated profile, which has a main profile body and one or a plurality of lateral disposals provided thereon, may be sheathed. Said profile may be an electrical conductor, such as a flat or round conductor for example, a light guide, a fluid-carrying pipe or a profile having another geometry. The disposals may be connecting pieces, protrusions of any kind, connecting pipes, contact tabs, stabilizing elements, and/or fastening elements, for example. The elongated profile may have a specific geometry that has a constant cross section perpendicularly to the direction of extension, with the constancy of the geometry being interrupted by the one or the plurality of disposals. The disposals may be provided in regular or irregular intervals and orientations at one or a plurality of sides. The disposals may be provided or connected integrally with the main profile body, and they can be made of the same or different materials. The disposals may have a specific function. for example, the disposals may be for fastening, stabilizing, electrical, and/or pneumatic contacting. In the following, the singular (disposal) or the plural (disposals) is used solely for simplifying the language. Unless the context specifically discusses a plurality of disposals, one or more disposals may be used.

In an embodiment, the main profile body is either partially or completely sheathed in a first synthetic material component. The sheathing may be applied by means of an extrusion process where a free-flowing synthetic material is extruded onto the main profile body and then compacted.

At least sections of the disposals may not be sheathed in the first synthetic component. Furthermore, in an embodiment, the disposals may be partially or completely sheathed in a second synthetic component.

The first synthetic component may form the actual sheath of the profile. The second synthetic component may be used to generate a backpressure during the sheathing process so that the first synthetic component does not completely sheath the disposals. Therefore, after the sheathing, the first synthetic component may not have to be removed from the disposals, which may involve a significant effort. Thus, disclosed embodiments may simplify the reworking of the sheathed profile.

In an embodiment, the second synthetic component may be easier to remove than the first synthetic component, for example, to facilitate easy access to the disposals after the sheathing process without high-effort milling or etching processes. If the main profile body is a flat conductor and the disposals are contact tabs and/or fastening elements, the flat conductor may be contacted via the contact tabs and/or fastened via the fastening elements by simply removing the second synthetics component.

In an embodiment, the first synthetics component may be firmly bonded to the profile whereas the second synthetics component may not be firmly bonded to the profile for easy removability. The firm bond can be achieved by means of a bonding agent, for example. According to another embodiment, the first synthetics component is a self-adhesive synthetic material. The firmly bonded connection of the first synthetic component may ensure an optimal link to the profile. Moreover, when the second synthetics component not firmly bonded (e.g., bonded to have a connection that is less strong than the firmly bonded connection of the first synthetic component), it may be removed very easily.

In order to prevent the first synthetics component from completely sheathing the main profile body and the disposals during the extrusion, the second synthetics component may be extruded onto the disposals at the same time, building up a backpressure. Using this process, the advance of the first synthetics component in the direction of the disposals may be stopped. According to another embodiment, the second synthetics component may be produced in advance and placed onto the disposals to be protected from the first synthetics component. Furthermore, this embodiment may simplify the setup of the extrusion tool. However, it may use additional process steps for separately producing the second synthetics component and applying the second synthetics component to the profile.

Clearances between adjacent disposals, or clearances between the main profile body and the disposals, which may exist in peripheral areas despite a firm bonding connection between the disposals and/or between the main profile body and the disposals, may be filled (e.g., partially or completely) with the first synthetic component. The filling may prevent moisture from entering between the clearances, which could create corrosion over time. The second synthetics component may be removed (e.g., completely or partially) afterwards and may serve as a masking or protection, for example.

In some embodiments, the main profile body and one or a plurality of the disposals may be made in one piece from the same material or a similar type of material. This may result in an especially simple structure of the profile. Moreover, in the case of an electrical conductor, any appearance of corrosion or other problems that may stem from a combination of two different materials do not have to be taken into account in the sheathing. If the function, application, geometry, or other properties of the profile limit the use to certain materials, the respective disposals may be sheathed (e.g., partially or completely) in the first synthetics component so that the transitional areas of the respective disposals to the main profile body are sheathed in the first synthetics component, in addition to the main profile body being sheathed in the first synthetics component.

In an embodiment, a device according to the disclosure performs the sheathing of the profile by means of extrusion. It has a passage for continuously putting through the profile, and at least two extrusion nozzles to feed the first synthetics component and the second synthetics component. The cross section of the passage approximately corresponds to the cross section of the profile so that the main profile body and the disposals can be transported through the device continuously and without hindrance. The two synthetics components are then supplied via the two extrusion nozzles in such a fashion that the main profile body is partially or completely sheathed in the first synthetics component, with at least sections of the disposals not being sheathed in the first synthetics component, and the disposals being partially or completely sheathed in the second synthetics component.

Depending on the viscosity of the two synthetics components, the two synthetics components may be advanced to prevent melted materials from leaking out of the tool by setting the advancing angle of the melt in the tool and the rate of feed of the profile. In that case, a sealing element may not be used in the tool in the area of the disposals.

However, a sealing element (e.g., a flap, a membrane, an elastic element, a seal) may be used to close the tool to prevent leaking of the two melted synthetics components. When the disposal enters the tool, the seal may be forcibly opened by the feed so that the melting second synthetics component (also in some embodiments the first synthetics component) is held back by the barrier of the seal.

According to another embodiment, a melt-sealing system is provided, which at least partially opens and closes the passage of the device by means of one or a plurality of movable elements. For example, the disposal may be recognized optically or mechanically via a control system and prompts an opening movement of the movable element. After the disposal has entered the extrusion tool, the control prompts a closing of the movable element. It is an advantage of said controlled, melt-sealing system that there is no mechanical stress at the disposals due to any forcibly opening seal.

The present disclosure may be suitable for sheathing a single-layer or multi-layer flat conductor where the disposals are lateral contact tabs, connecting elements and/or fastening elements. For example, in automotive engineering, efficient manufacturing processes with excellent quality and durability are desirable. The disclosed sheathing technology may provide an efficient manufacturing process with quality products by reducing the need to rework sheathed profiles produced in this manner. Disclosed embodiments may also be used in other areas such as, for example, the transportation field in general, the field of aviation, space operations, shipping, rail traffic engineering, furniture making, electrics and electronics (e.g., entertainment electronics), medical technology, building technology, structural engineering, and/or drywall. Disclosed embodiments may also be used in civil engineering and road engineering.

Disclosed embodiments may include a sheathed profile that was produced with the help of an embodiment of the method according to this disclosure. This type of sheathed, elongated profile has a main profile body and one or a plurality of disposals provided thereon. The main profile body and part of the disposals are partially or completely sheathed in the first synthetics component, with another part of the disposals not being sheathed in the first synthetics component. This type of profile can be distinguished from a conventionally produced profile as follows: With the conventionally produced profiles, first a main profile body of a constant cross section is sheathed in a synthetic material. Then the synthetic material is removed again in some places to affix appropriate disposals there, either by welding or some other form of connection. After the welding- and/or connecting process, the transitions between the main profile body and the disposals are again sheathed in a synthetic material. In this way the synthetic material that encloses the main profile body is not connected integrally to the synthetic material that partially encloses the disposal. With profiles according to this disclosure, the main profile body and part of the disposals may sheathed (e.g., partially or completely) in the same first synthetics component. This design may result in integrally connection the synthetic material that encloses the main profile body with the synthetic material that partially encloses the disposal. This profile may fill the clearance between a disposal and the main profile body and/or a clearance between adjacent disposals with the first synthetics component.

The disclosed embodiment are described in the detailed description below. The characteristics described there can be realized alone or in combination with one or a plurality of the characteristics mentioned above to the extent that the characteristics are not contradictory. The following description is made with reference to the accompanying drawings.

DESCRIPTION OF THE EMBODIMENTS

Figure 1:
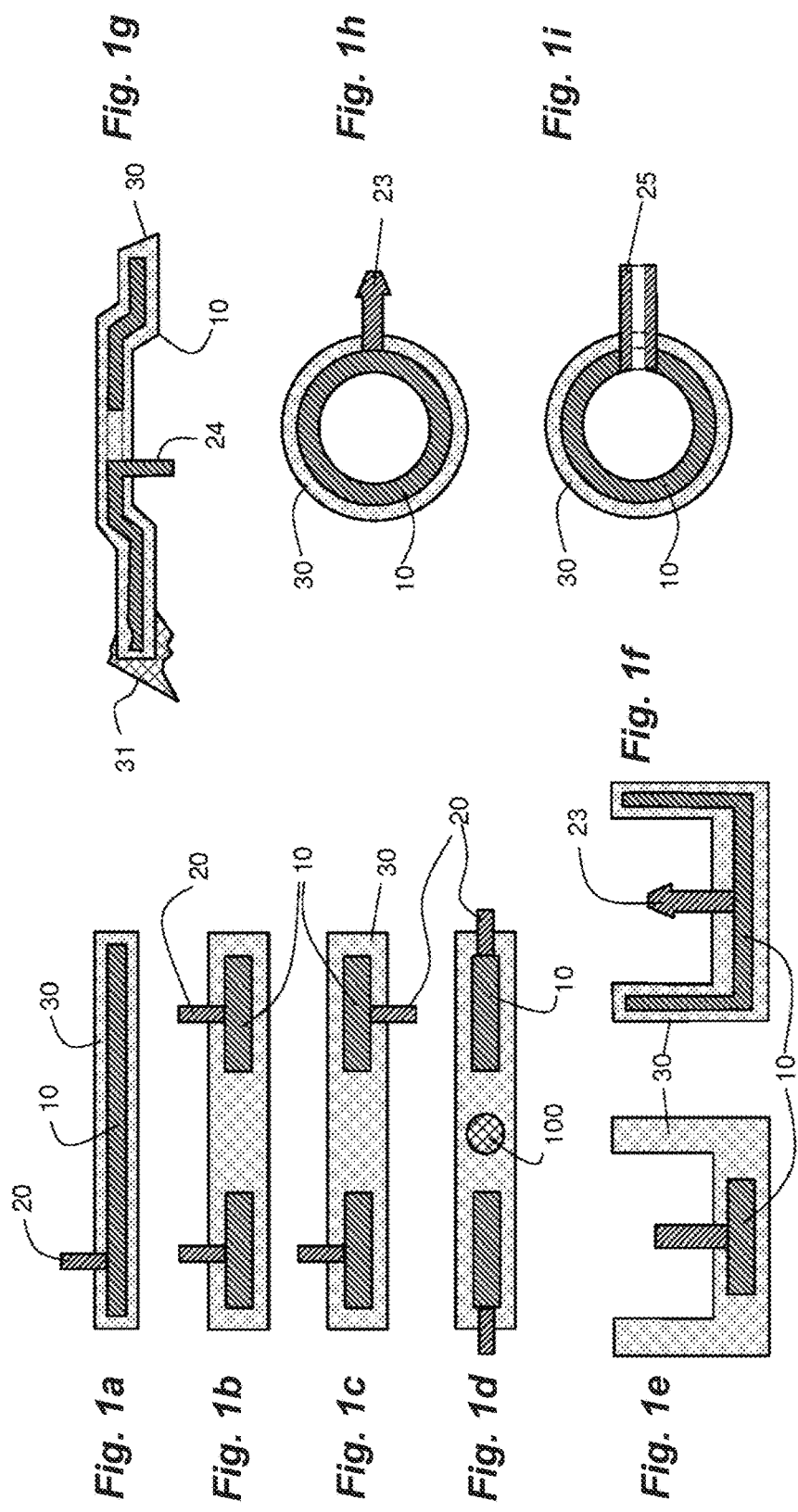
FIGS. 1$a$, 1$b$, 1$c$, 1$d$, 1$e$, 1$f$, 1$g$, 1$h$, and 1$i$ show cross-sections of elongated sheathed profiles, consistent with disclosed embodiments.

FIGS. 1a, 1b, 1c, 1d, 1e, 1f, 1g, 1h, and 1i show example cross sections of profiles with continuous and/or discontinuous disposals. Here and in all other figures, the reference symbol 10 describes a main profile body. As shown in the FIGS. 1a through 1i, the main profile body 10 is developed elongated perpendicular to the paper level. Disposals that are provided on the main profile body 10 are generally described with the reference symbol 20, and in specific embodiments with the reference symbols 21 to 25. The disposals 20 to 25 consist of the same or a different material than the main profile body 10. Furthermore, various disposals 20 of various materials may be provided. The disposals 20 to 25 may be provided laterally on the main profile body 10; they can be provided at multiple sides of the main profile body 10, continuously or discontinuously.

The sheathed profiles shown here may be suitable for use as one-layer or multi-layer flat conductors for built-ins in automobile manufacturing. The main profile body 10 and the lateral disposals 20 to 25 are therefore current-carrying. However, the profiles of FIGS. 1a through 1i show other embodiments; the cross sections shown here emphasize the broad application of the sheathed profiles across many branches of the industry. For example, the sheathed profile shown in FIG. 1d has two main bodies 10 developed as flat conductors with associated lateral disposals 20 and an additional extruded in and/or sheathed material 100, which can be a light guide or a stranded conductor, for example. The main profile body 10 and the lateral disposals 20 to 25 can be provided for current carrying, light guiding, fluid carrying, mechanically stabilizing, fastening, for example. The arrangement may be used for additional functions and or purposes consistent with this disclosure. In the case of an electrical line, the main profile body 10 and/or the lateral disposals 20 to 25 may be made of metal (e.g., aluminum or copper). In another embodiment, the main profile body 10 and/or the lateral disposals 20 to 25 may have glass fibers or consist of a transparent synthetic material (e.g., polycarbonate or PMMA). The lateral disposals 20 to 25 may also be constructed of a plurality of compound metals (e.g., steel, aluminum and copper).

FIG. 1f illustrates the fastening function discussed above as a possible embodiment form of the disposals, where a partially sheathed fastening element 23 (e.g., a metal clip) may be provided on the main profile body 10. This type of fastening element 23 is shown in FIG. 1h with reference to a main profile body 10 having a tubular shape.

FIG. 1g shows a profile where a disposal 24, which has been punched out of the main profile body 10, is partially sheathed. This may be a contact tab for electrical contacting or it can also be a fastening element.

FIG. 1i shows a tubular main profile body 10 with an open disposal 25, which is continuously or non-continuously attached thereto. The tubular main profile body 10 may serve, for example, as a pneumatics or hydraulics body, or generally as fluid- or medium-conveying element.

Figure 3:
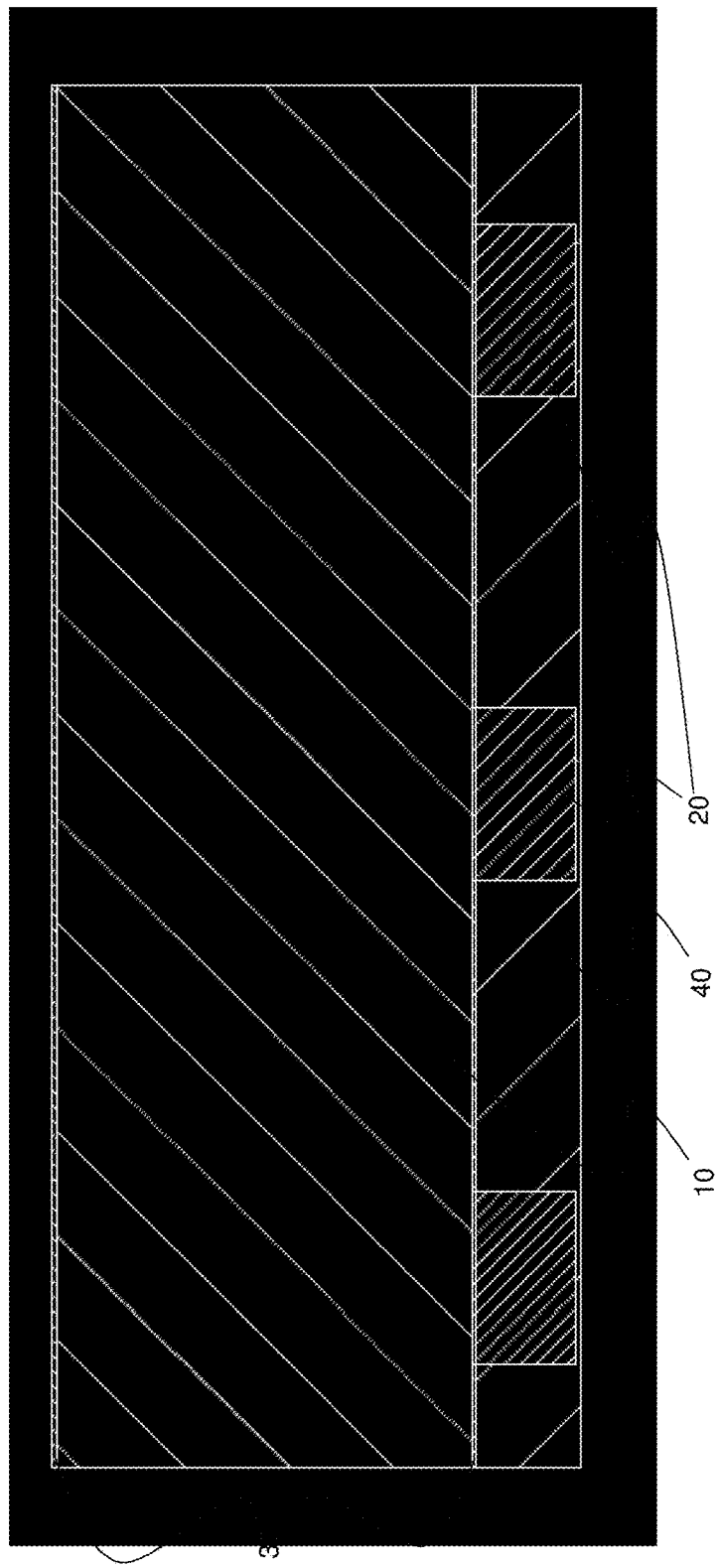
FIG. 3 shows a completely sheathed flat conductor in section along the main direction of extension, consistent with disclosed embodiments.

In all figures, the reference symbol 30 may refer to a first synthetics component that is firmly bonded to the main profile body 10 as sheathing. The first synthetics component 30 may sheath the main profile body 10 completely, but without completely sheathing the disposals 20 to 25. Rather, said disposals may be at least partially sheathed in a second synthetics material 40, which is not firmly bonded, as shown in FIG. 3. Although the first synthetics component 30 may not completely sheath the lateral disposals 20 to 25, it can sheath them in the area of the lateral disposals 20 to 25, or even sections of the lateral disposals 20 to 25, as described below. The second synthetics component 40, which is not firmly bonding, may act as a counter-element with respect to the main profile body 10 and/or the lateral disposals 20 to 25, which may form part of the final sheathing of the profile. Second synthetics component 40 may be removed to expose one or a plurality of lateral disposals 20 to 25.

The firm bonding connection between the first synthetics component 30 and the main profile body 10 can be obtained, for example, by using a bonding agent. According to another embodiment, the first synthetics component 30 is a self-adhesive synthetic material. For example, both synthetics components 30 and 40 may consist of a thermoplastic synthetic material (e.g., PP, PE, TPE, or PVC) or duroplastic and/or elastomer synthetic materials, which are linked, if applicable (e.g., PUR).

FIG. 1g shows an embodiment where, in addition to the firmly bonded sheathing with the first synthetics component 30 and the non-firmly bonded sheathing with the second synthetic embodiment 40 (not shown), an additional firmly bonded synthetics component 31 is attached at the main body or even at the first synthetics component 30. It may be developed as a sealing lip, for example.

The following embodiment forms are shown using an electrical flat conductor with lateral disposals 20, which are usually developed as contact tabs. The disposals 20 may be stripped for subsequent contacting (e.g., screwing, tox clinching, clamping via lamella contact, etc.).

On the other hand, the connecting point between the disposals 20 and the flat conductor 10 (e.g., a welding seam) may be included in the insulation and remain insulated. There may be a transitional area between an disposal 20 and the flat conductor 10, such as a transition from aluminum to copper, for example. This is where the first synthetics component 30 may seal said transitional area with firm bonding to avoid any electrical corrosion.

Figure 2:
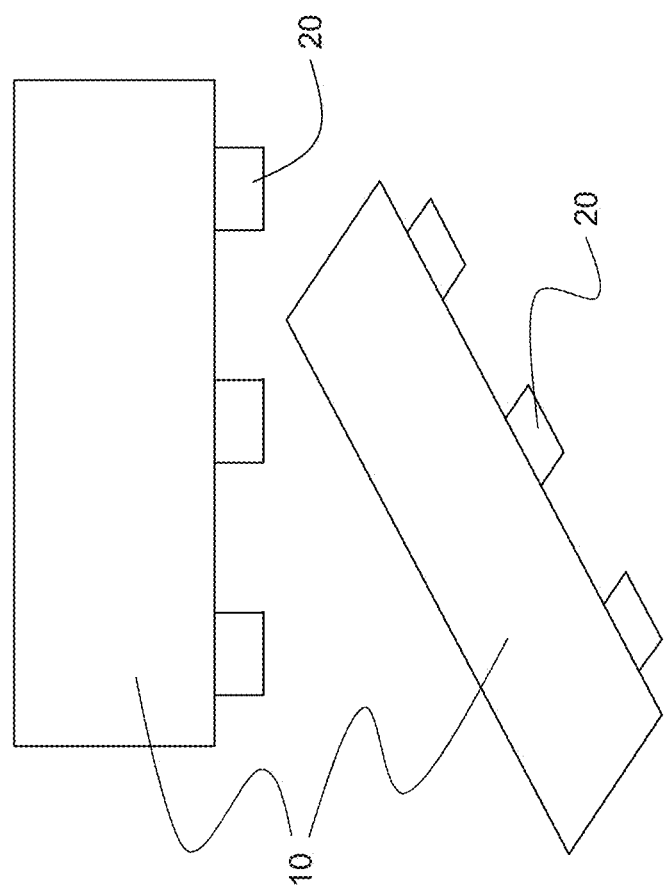
FIG. 2 shows a flat conductor as an example of an elongated profile, consistent with disclosed embodiments.
Figure 4:
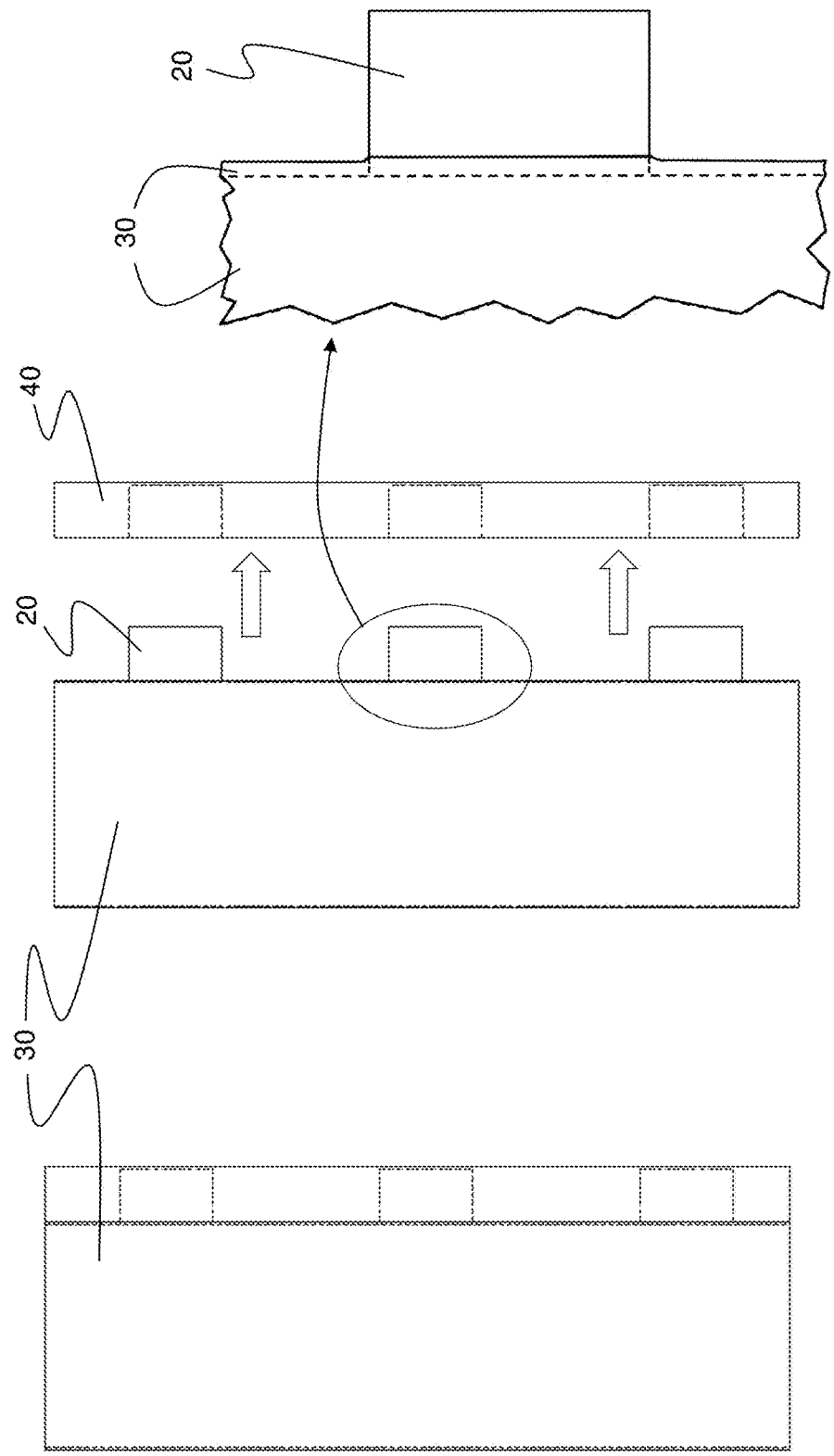
FIG. 4 shows the removal of the second synthetics component with a sheathed flat conductor, consistent with disclosed embodiments.

FIG. 2 shows, as an example of a main profile body 10, a flat conductor with disposals 20 developed as contact tabs. The flat conductor 10 is sheathed in a first synthetics component 30, and the contact tabs 20 and the clearance in the lateral area between the contact tabs 20 are provided with a second synthetics component 40, as shown in FIGS. 3 and 4. Unlike the first synthetics component 30, the second synthetics component 40 is not provided with firm bonding and can be removed after the extrusion process. For example, as shown the top view of the flat conductor in FIG. 4, the second synthetic component 40 may be affixed and/or removed. FIG. 4 illustrates an embodiment where a longitudinal section of the completely sheathed flat conductor 10 along the main direction of extension.

The extrusion of a second synthetics component 40 may be provided to embed, position, and guide the flat conductor 10 with lateral disposals 20 in an extrusion tool for a controlled extrusion of the first synthetic component 30. The first synthetic component 30 may be the actual electrical sheathing of the flat conductor 10, which may ensure an optimal adhesion/connection to the surface of the main profile body 10 and a diffusion strength of the media.

Figure 5:
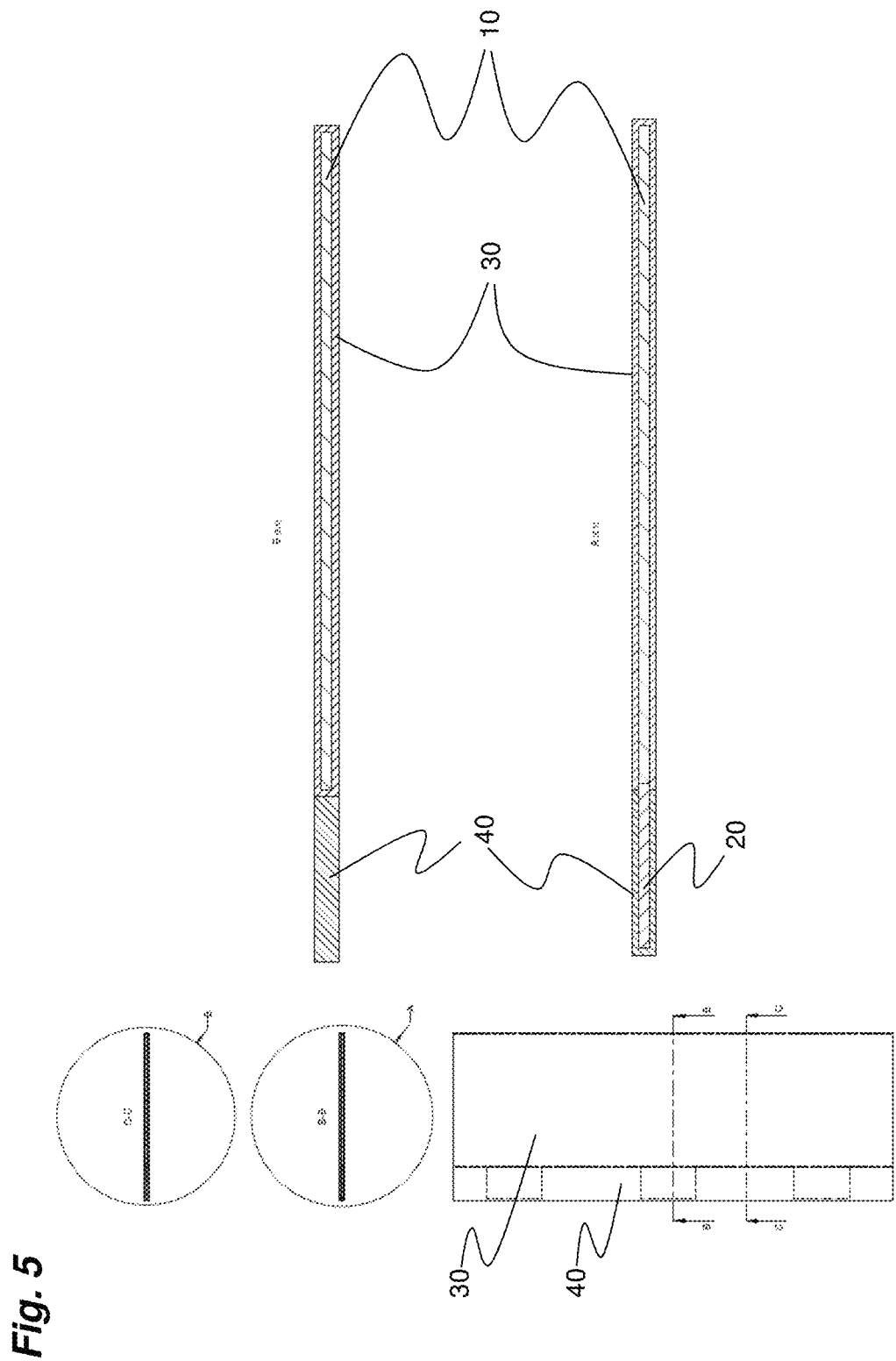
FIG. 5 shows a cross section of the sheathed flat conductor, consistent with disclosed embodiments.
Figure 6:
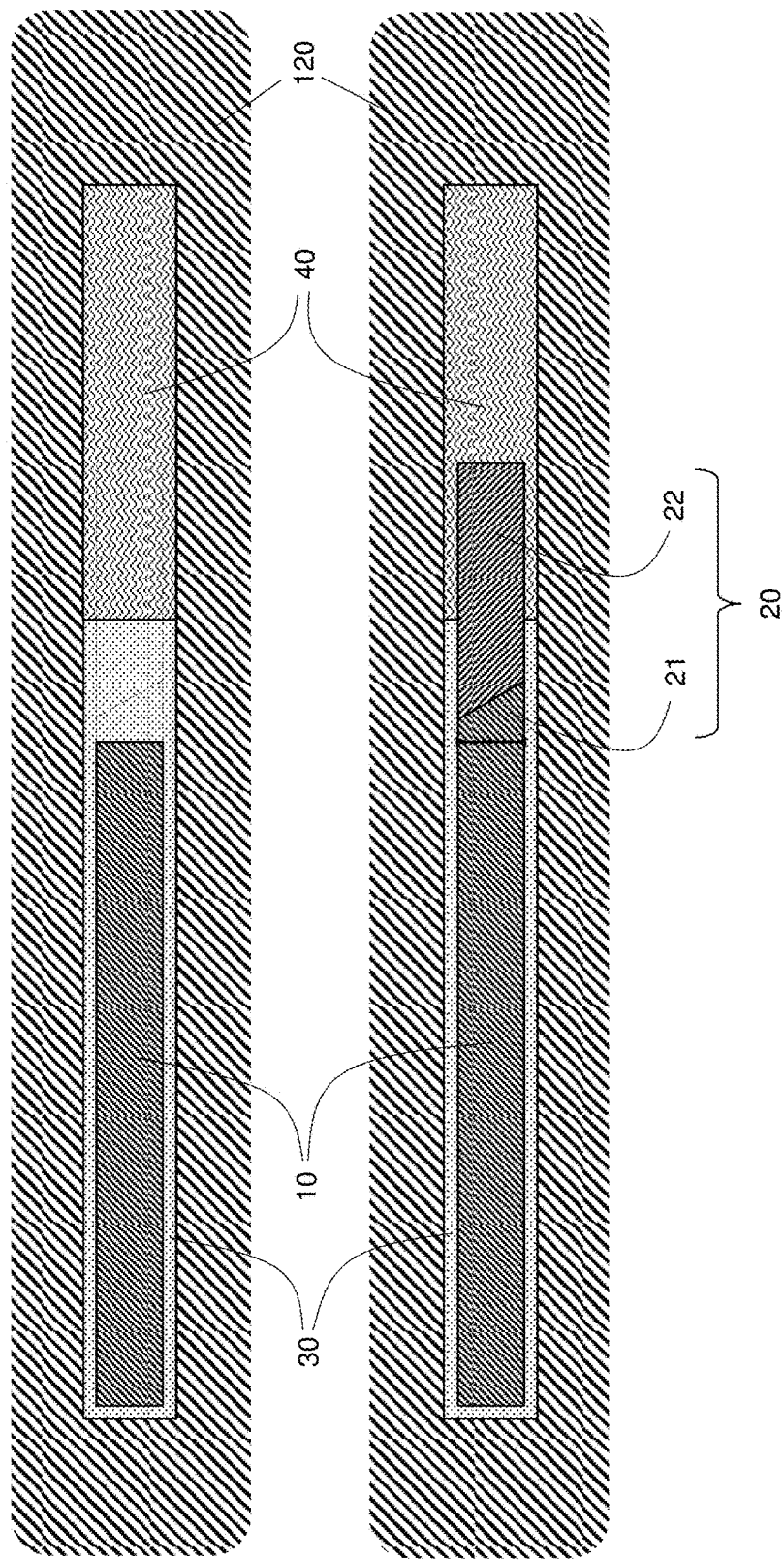
FIG. 6 is a schematic representation of a flat conductor during the sheathing in the tool, consistent with disclosed embodiments; two cross sections with and without disposal are shown.
Figure 7:
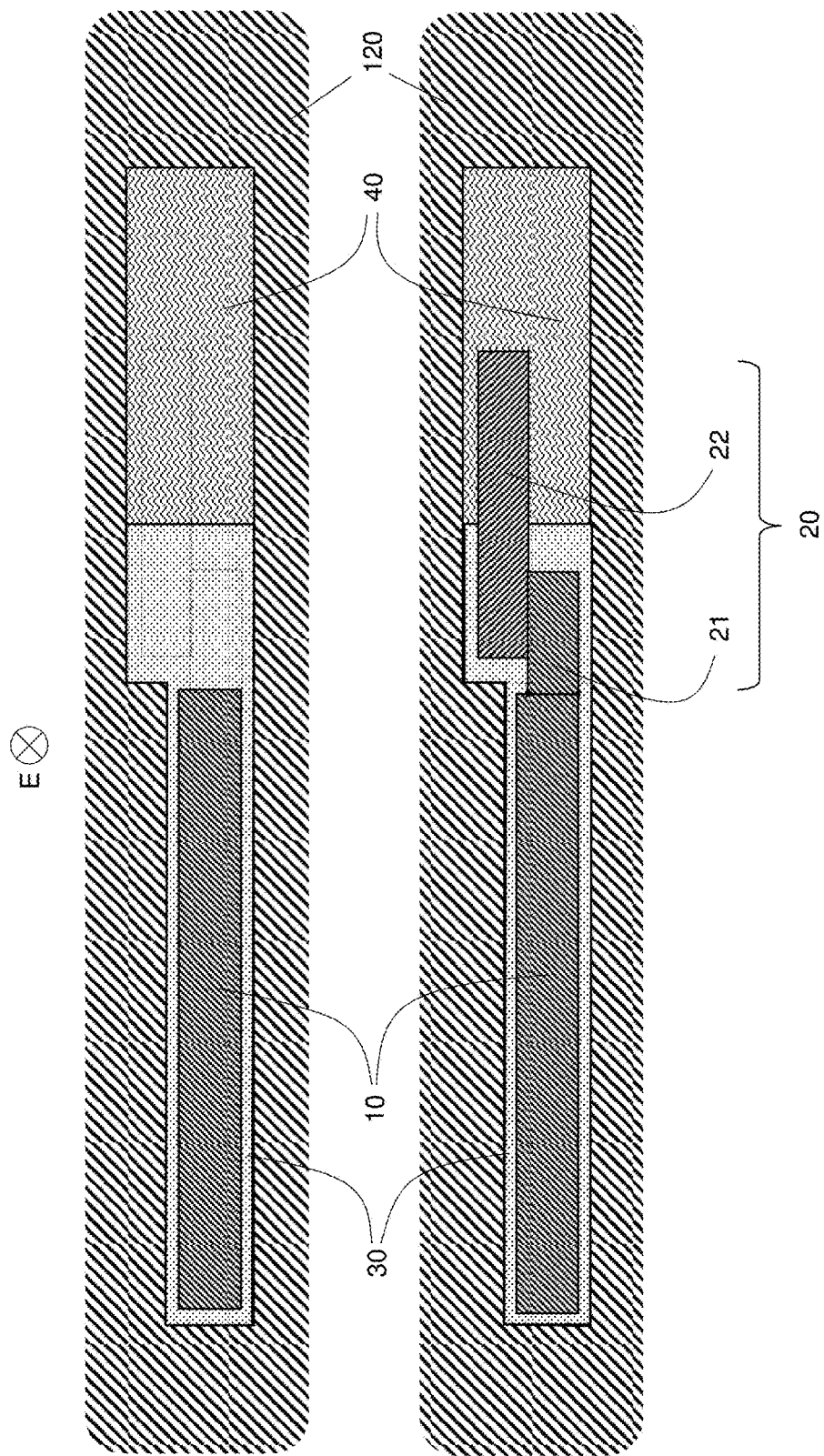
FIG. 7 is a schematic representation of another flat conductor during the sheathing in the tool, consistent with disclosed embodiments; two cross sections with and without disposal are shown.

FIGS. 5, 6, and 7 show contact tabs 20, 21, 22 as disposals that consist of an aluminum copper compound. FIG. 6 shows a roll-bonded Al—Cu contact tab 20, and FIG. 7 shows a welded Al—Cu contact 21, 22. The reference symbol 21 describes a lamella of similar material (e.g., aluminum) which is welded to the flat conductor 10. The reference symbol 22 describes a contact tab, for example of copper, which is connected at the aluminum lamella 21. When using this type of pairing of materials, the transitional area to the first synthetics component 30 may be sealed because of the electrolytic decomposition. In some embodiments, a wider area of the first synthetics component 30 may be extruded in the FIGS. 6 and 7 to enclose the transitional area of the contact tab 20.

Figure 8:
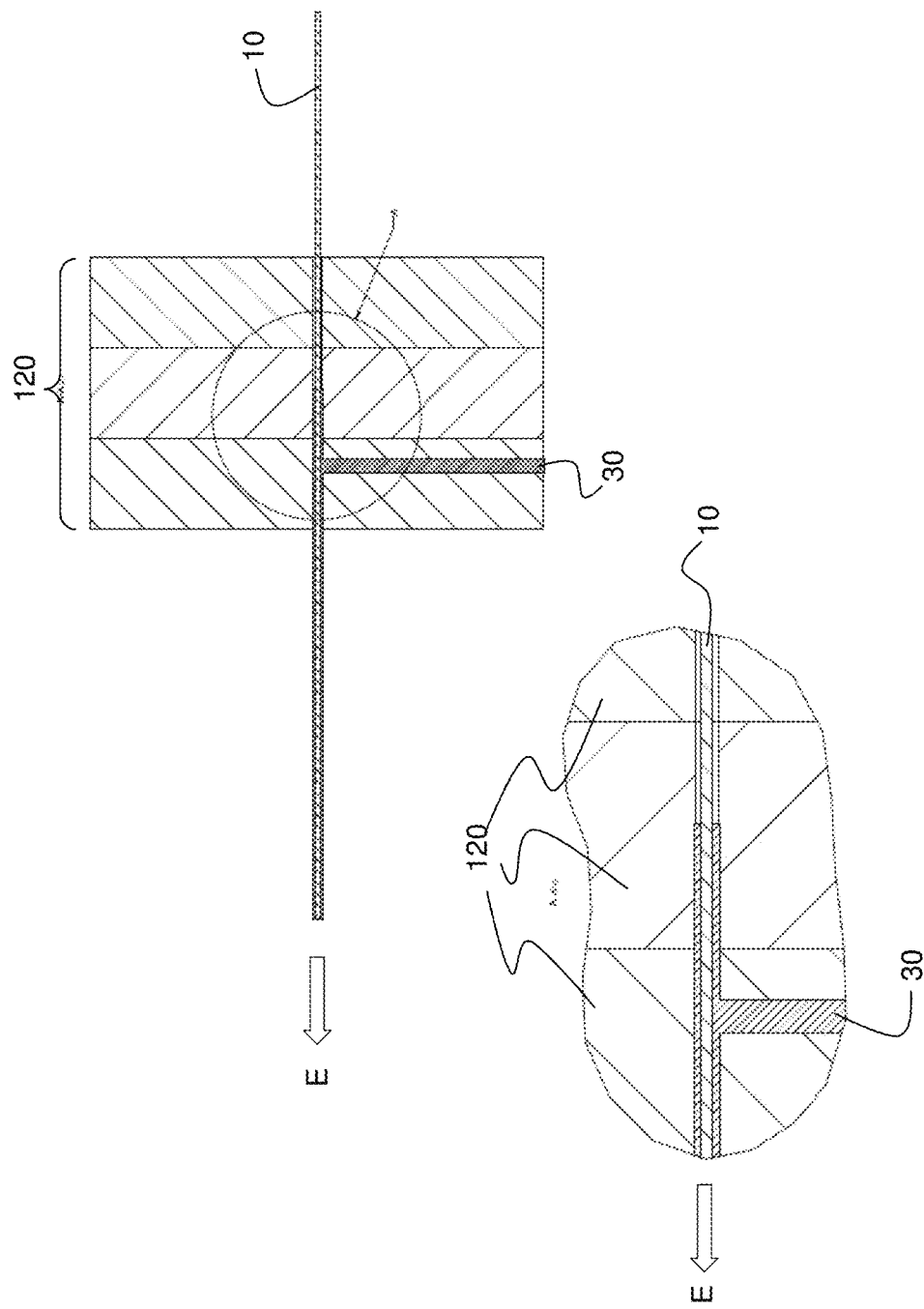
FIG. 8 shows a sectional representation of an extrusion tool with two material feeds for sheathing a profile, consistent with disclosed embodiments.
Figure 9:
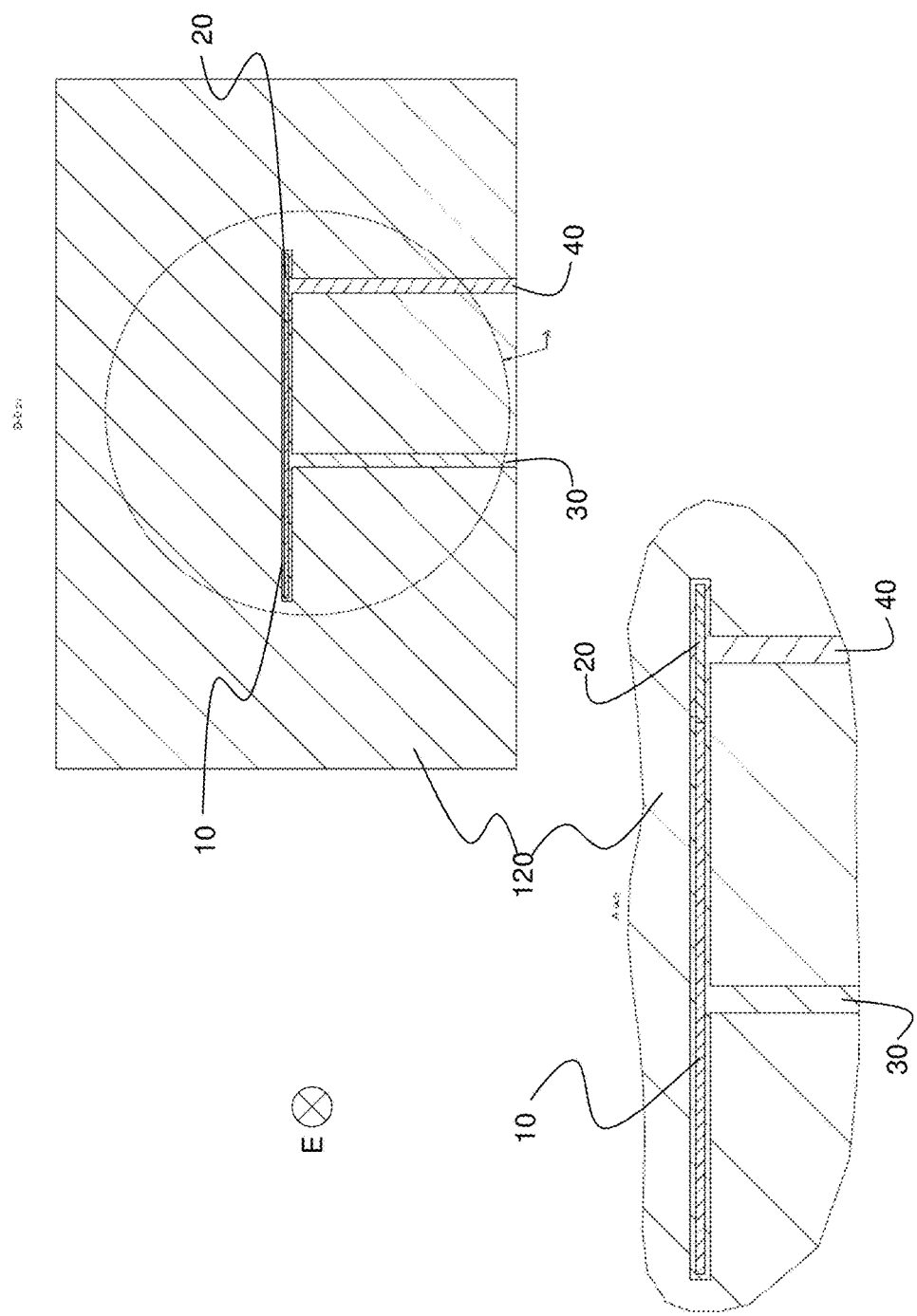
FIG. 9 shows another sectional representation of an extrusion tool with two material feeds for sheathing a profile, consistent with disclosed embodiments.

FIGS. 8, 9, 10, 11, and 12 are schematic representations of a tool 120 with matrix and extrusion nozzle consisting of a plurality of tool plates according to some embodiments. These figures may illustrate an example of advancing of the first synthetics component 30 and the second synthetics component 40 to the flat conductor 10 and to the contact tabs 20. The direction of extrusion (e.g. the transport direction of the profile during the extrusion) is marked with an arrow E. FIG. 8 shows a section through the flat conductor 10 along the main direction of extension, and FIG. 9 shows a sectional representation in the extrusion tool 120 perpendicular to the main direction of extension of the flat conductor. FIG. 9 shows how the first synthetics component 30 and the second synthetics component 40 are injected onto and around the flat conductor 10 with contact tabs 20 via one each nozzle.

FIGS. 8, 9, 10, 11, and 12 show example embodiments of the structure of the extrusion tool 120 with an open entry cross-section. At an increased viscosity of the first synthetics component 30 and the second synthetics component 40, the two synthetics components 30 and 40 can be carried along by setting the feed angle of the melt in the tool 120 and the rate of feed of the flat conductor 10 so as to avoid any escape of melt from the tool 120. In these embodiments, the passage does not have to be sealed in the area of the contact tabs 20 in the tool 120.

Figure 10:
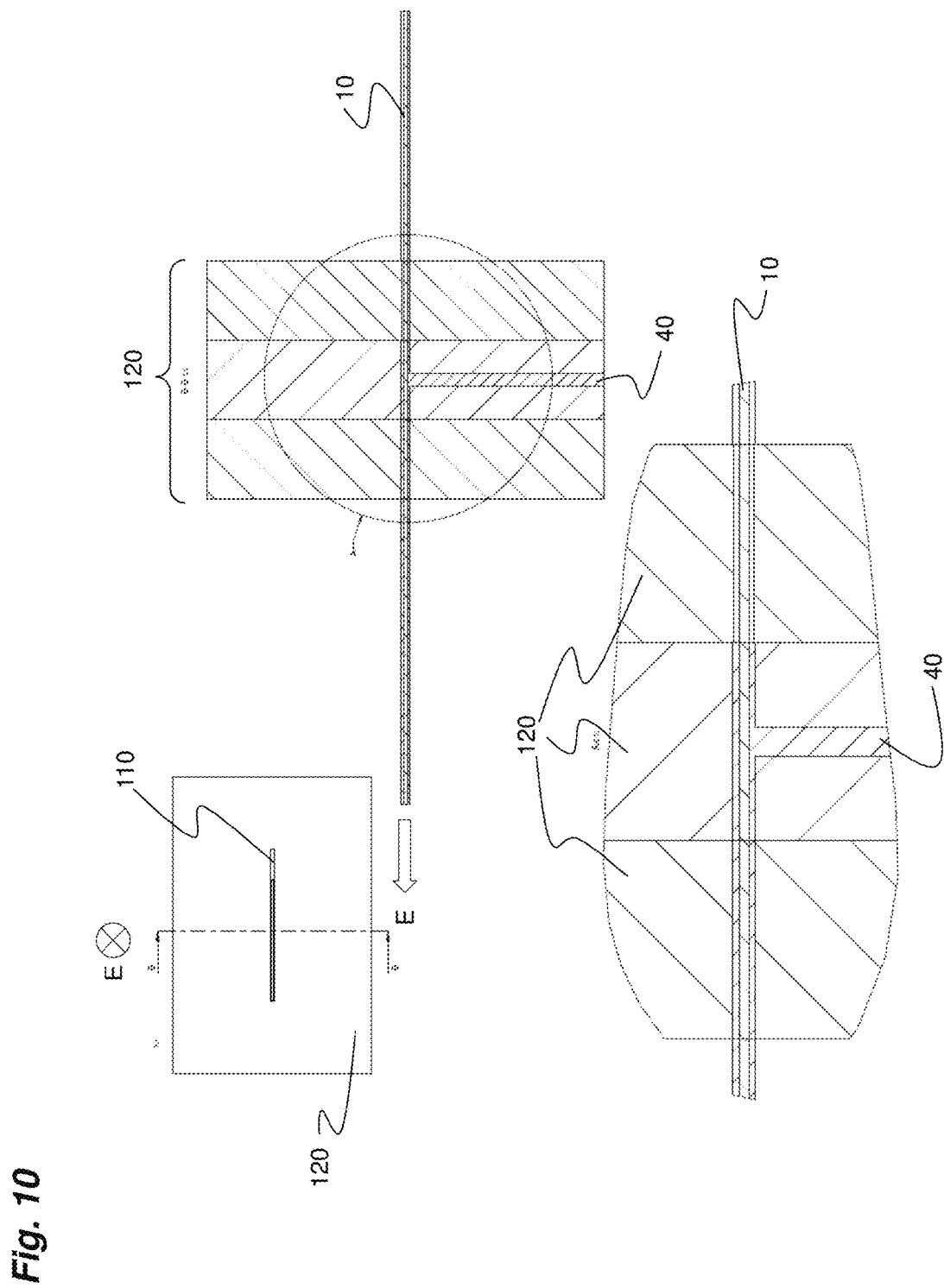
FIG. 10 shows another sectional representation of an extrusion tool with two material feeds for sheathing a profile, consistent with disclosed embodiments.
Figure 11:
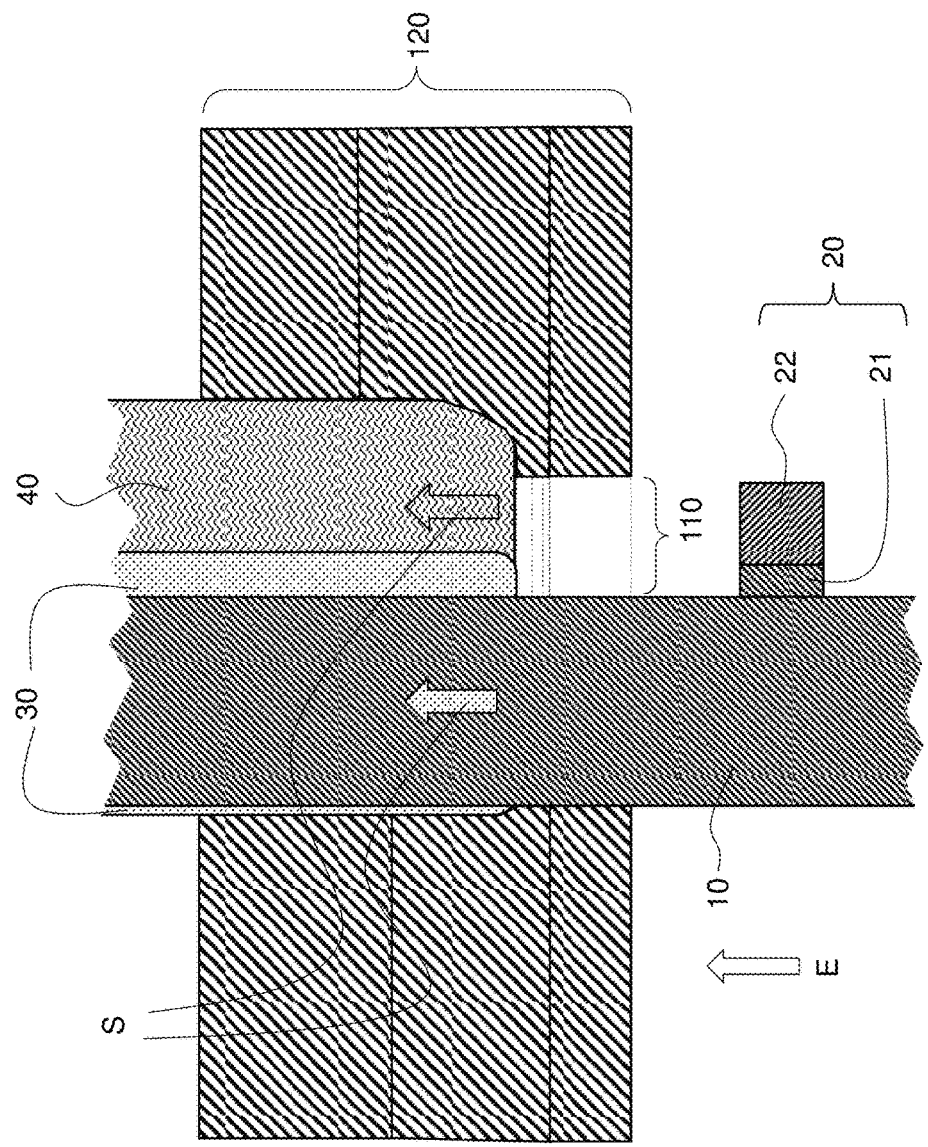
FIG. 11 shows another sectional representation of an extrusion tool with two material feeds for sheathing a profile, consistent with disclosed embodiments.
Figure 12:
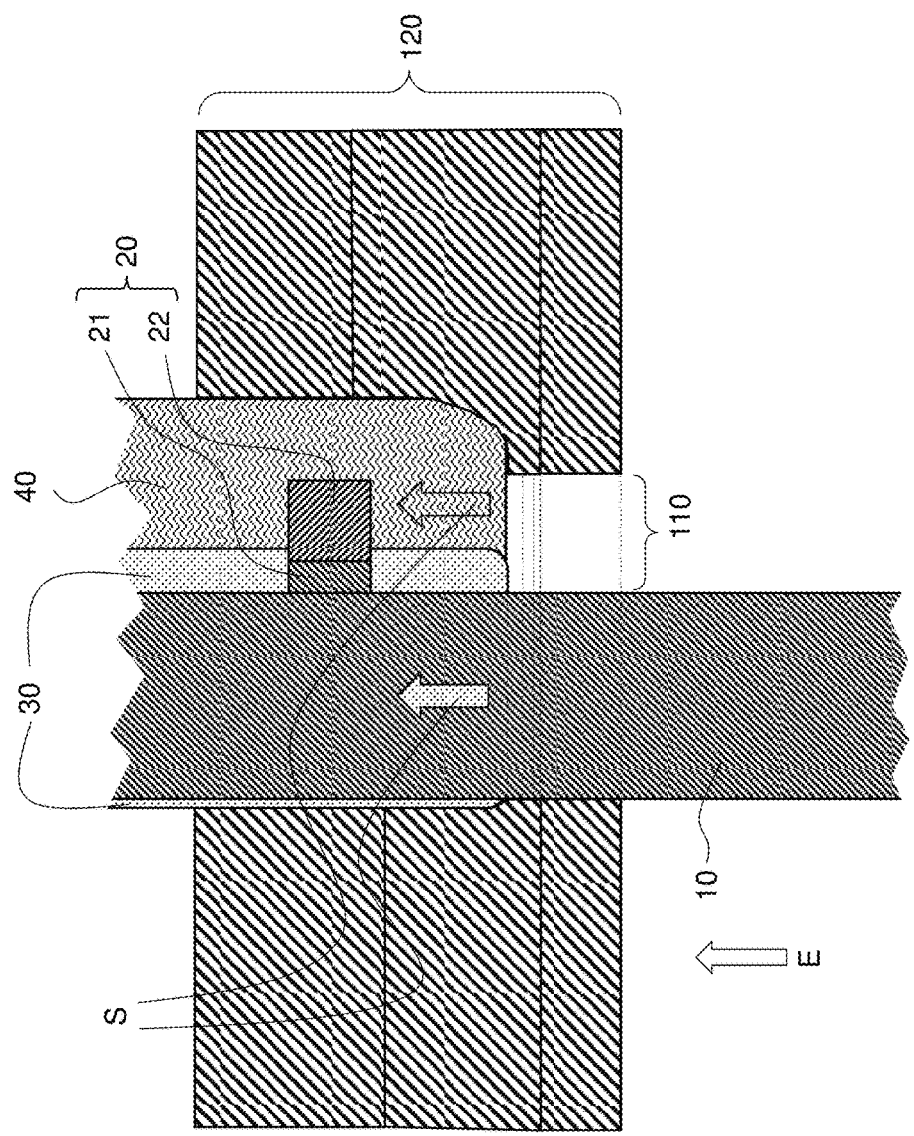
FIG. 12 shows another sectional representation of an extrusion tool with two material feeds for sheathing a profile, consistent with disclosed embodiments.

FIG. 10 shows a frontal view and a sectional representation through the main profile body 10 along the main direction of extension. FIG. 11 shows a sectional top view with disposal 20 (e.g. lamella 21 and contact tab 22) in front of the tool 120. FIG. 12 shows a sectional top view with disposal 20, e.g. lamella 21 and contact tab 22, in the tool 120.

The reference symbol 110 describes the open entry cross-section in the area of the disposal 20 of the tool 120. This is part of the overall cross-section of the passage through which the main profile body 10 and the fitting strips 20 to 25 are guided. The arrows S mark the feed direction of the melt, which is set such that the second synthetics component 40 generates a backpressure relative to the first synthetics component 30 in such a fashion that the disposals 20 are at least partially not sheathed by the first synthetics component 30, but rather by the second synthetics component 40.

Another embodiment of the extrusion tool 120 with temporarily open entry cross-section is shown in FIGS. 13, 14, 15, and 16.

Figure 13:
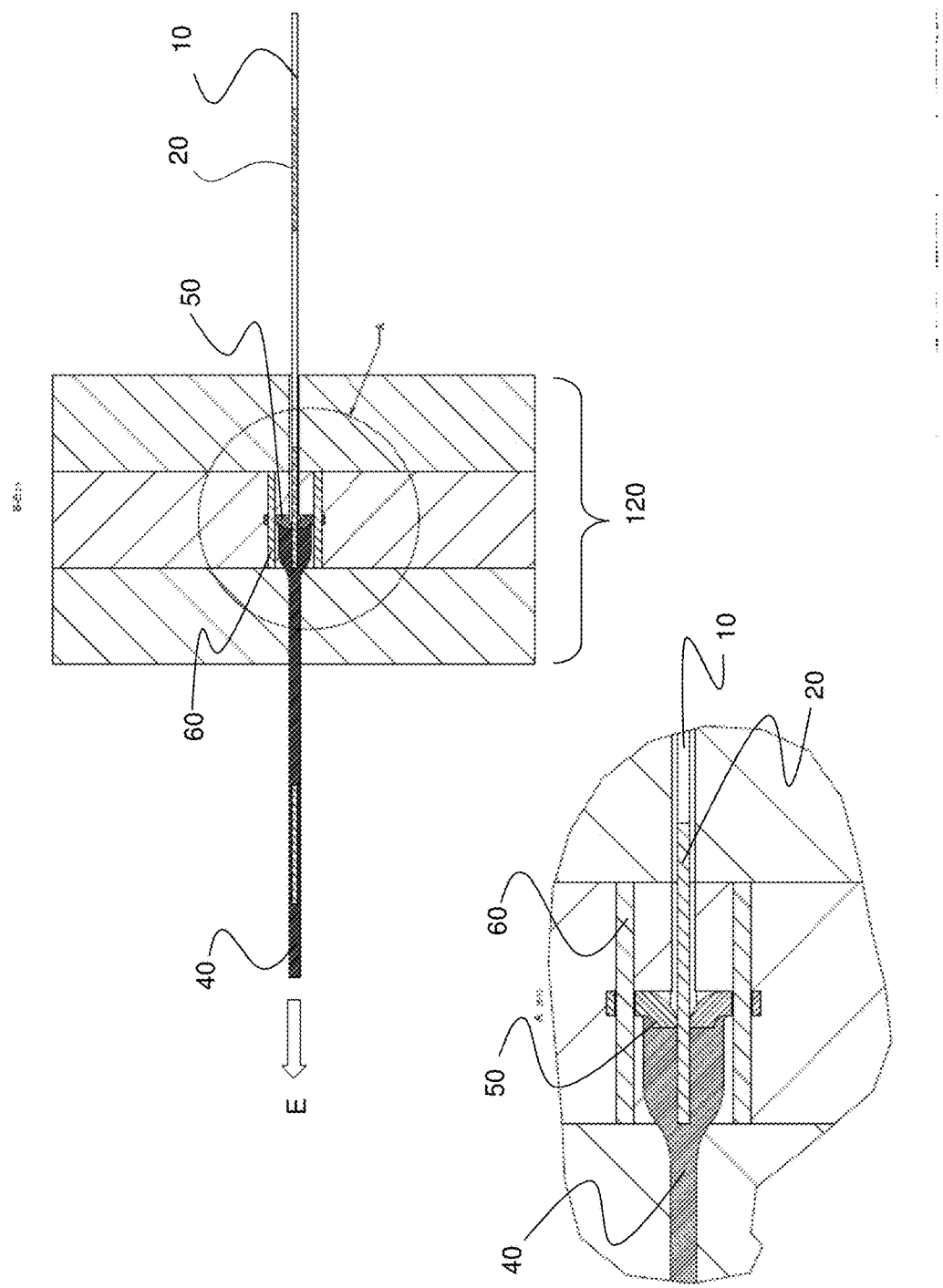
FIG. 13 shows a sectional representation of another embodiment of the extrusion tool, consistent with disclosed embodiments.

The entry area cross-section of the tool 120 at the level of the lateral disposals 20 is closed by one or a plurality of melt-tight flaps, membranes—or as they are generally called, seals —50 against melt escaping from the first synthetics component 30 and most of all from the second synthetics component 40. The seal 50 may be stiff or elastic, such as rubber-like, for example. When the lateral disposal 20 enters into the tool 120, the seal 50 is forcibly opened due to the advance so that the melt of the second synthetics component 40 is held back by the sealing effect to the lateral disposal 20. The forcible opening occurs here due to a direct, mechanical contact of the disposals 20 and the seal 50. FIG. 13 shows a sectional representation at the level of the second synthetics component 40, as well as an enlarged representation of the relevant area, when the seal 50 is open. An example of fixing the seal 50 in place is described with the reference symbol 60.

Figure 14:
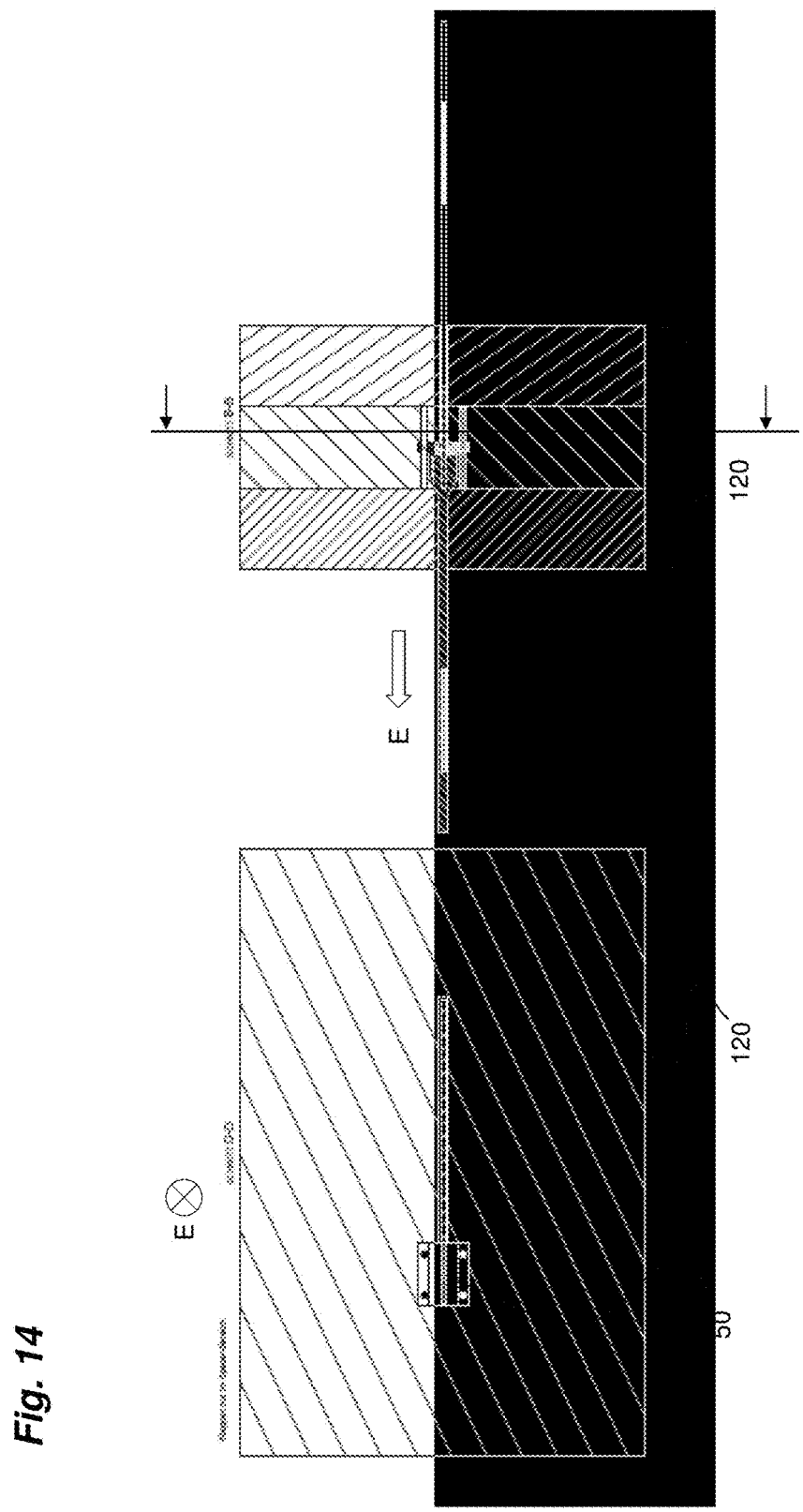
FIG. 14 shows another sectional representation of another embodiment of the extrusion tool, consistent with disclosed embodiments.
Figure 15:
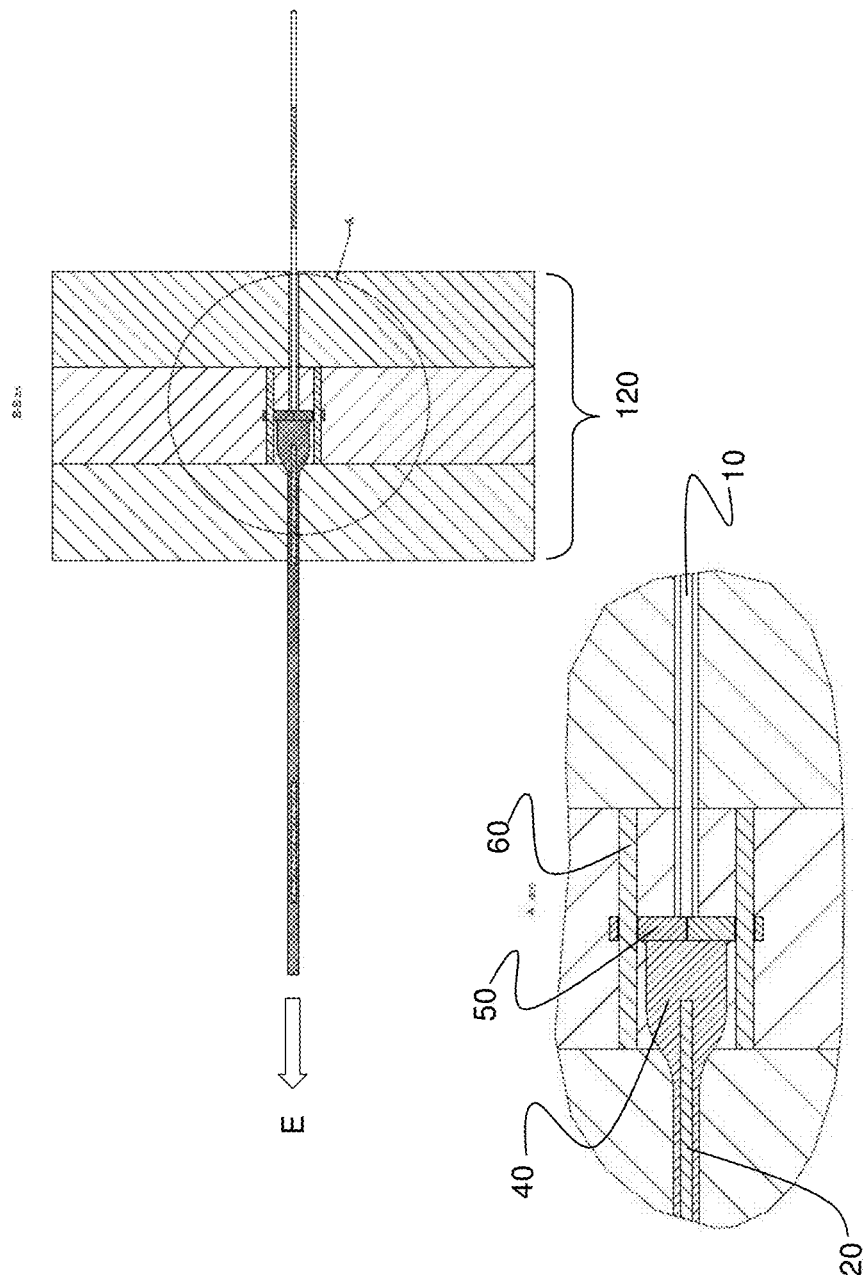
FIG. 15 shows another sectional representation of another embodiment of the extrusion tool, consistent with disclosed embodiments.

FIG. 14 shows the section of FIG. 13 as well as a frontal section along the drawn line of intersection. FIG. 15 shows the extrusion tool 120 with closed seal 50. The sectional representation is taken at the level of the second synthetics component 40.

Figure 16:
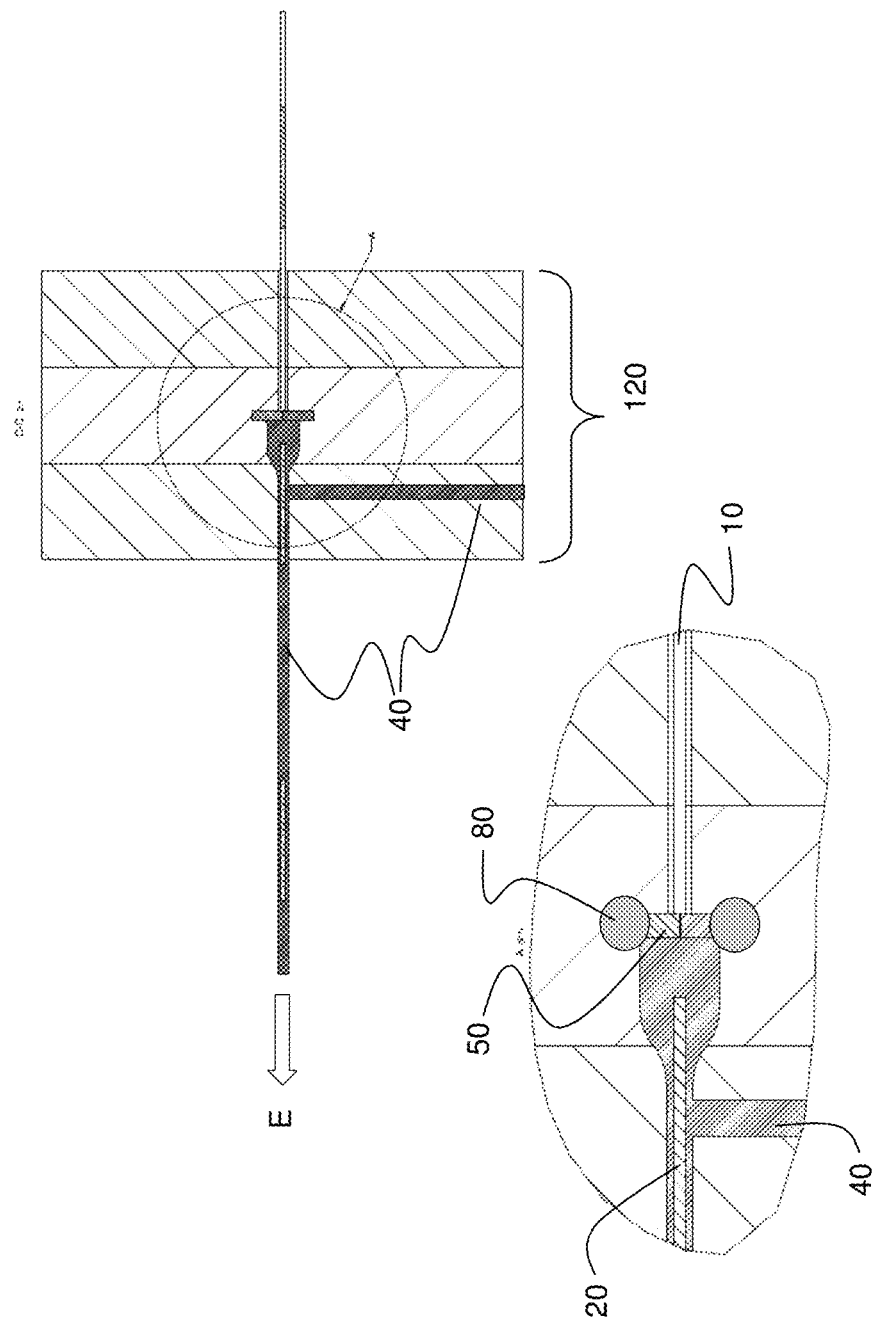
FIG. 16 shows a modification of the extrusion tool, consistent with disclosed embodiments.

As shown in FIGS. 13, 14, and 15, the melt-sealing system is developed as a flexible, rubber-like seal. FIG. 16 shows a modification in which the melt-sealing system is developed as a stiff flap 50 with a pivot joint and/or hinge 80. Alternately, the arrangement could also be realized horizontally in the tool 120 as a one-sided sealing system relative to the main profile body 10.

Another embodiment of the extrusion tool 120 with temporarily open entry cross-section, with the opening of the area of the lateral disposal 20 of the main profile body 10 being controlled and/or regulated by one or a plurality of slides here, horizontally or vertically, is shown in FIGS. 17, 18, 19, 20, and 21.

Figure 17:
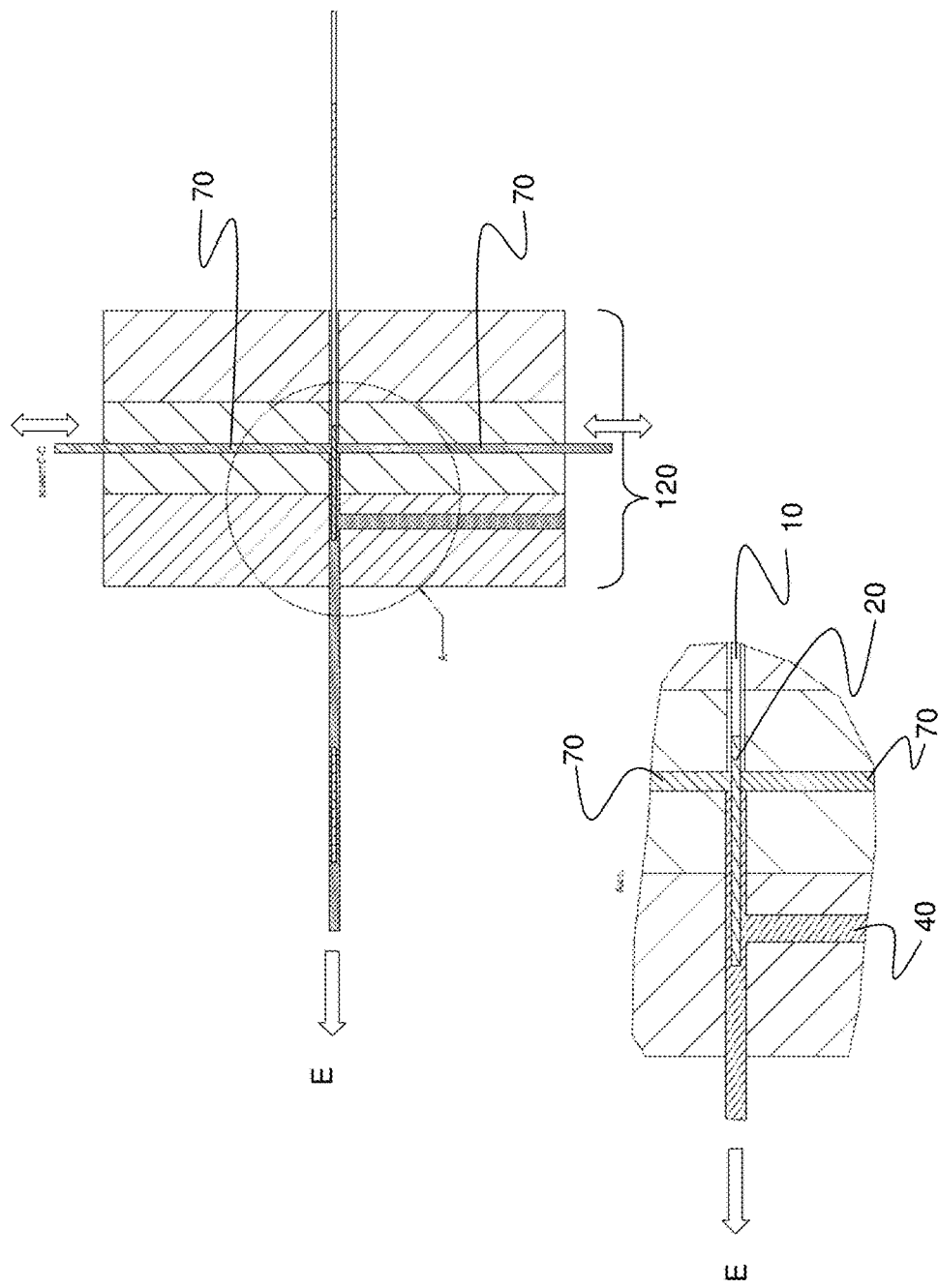
FIG. 17 shows a sectional view of an extrusion tool of another embodiment, consistent with disclosed embodiments.
Figure 18:
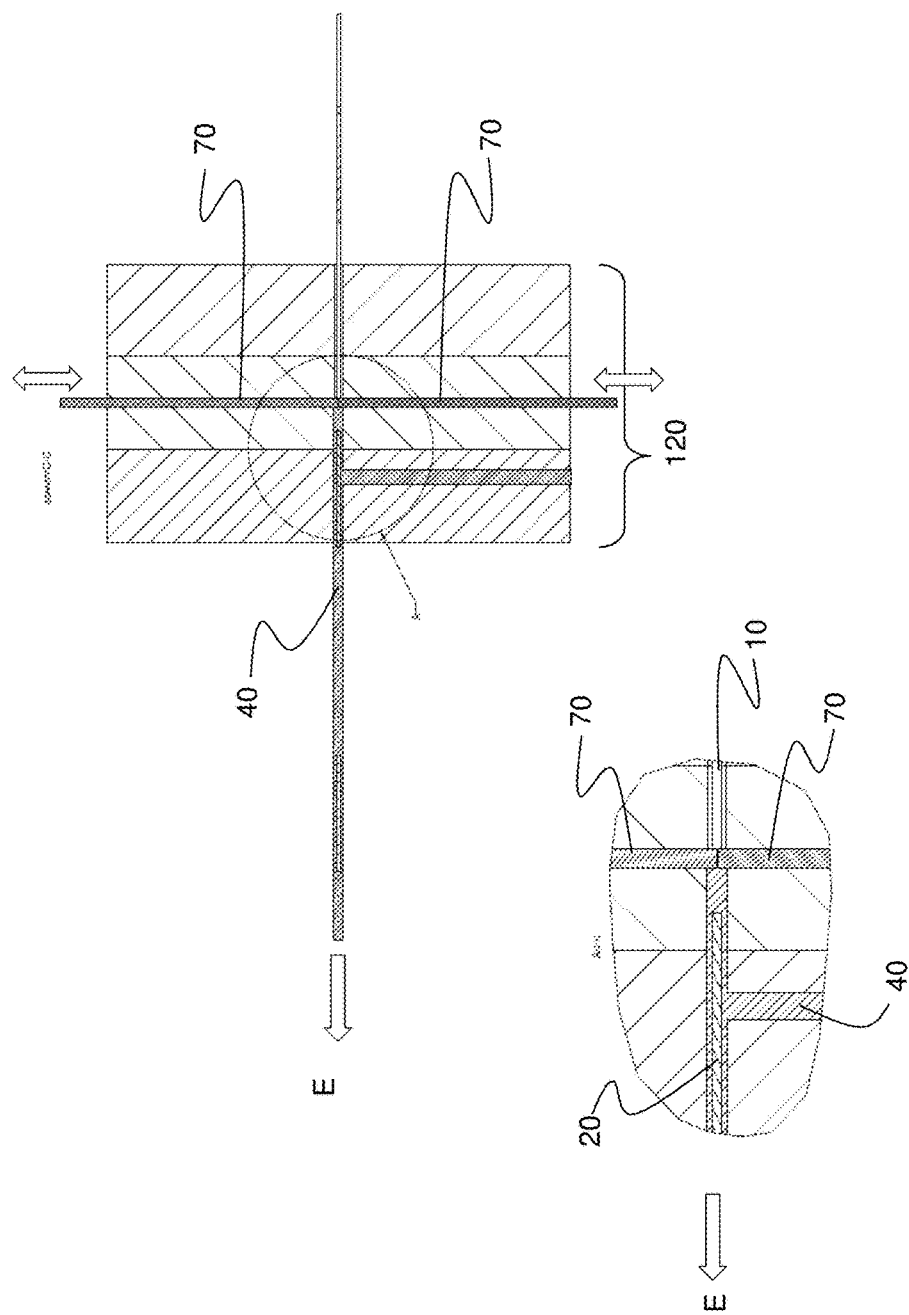
FIG. 18 shows another sectional view of an extrusion tool of another embodiment, consistent with disclosed embodiments.
Figure 19:
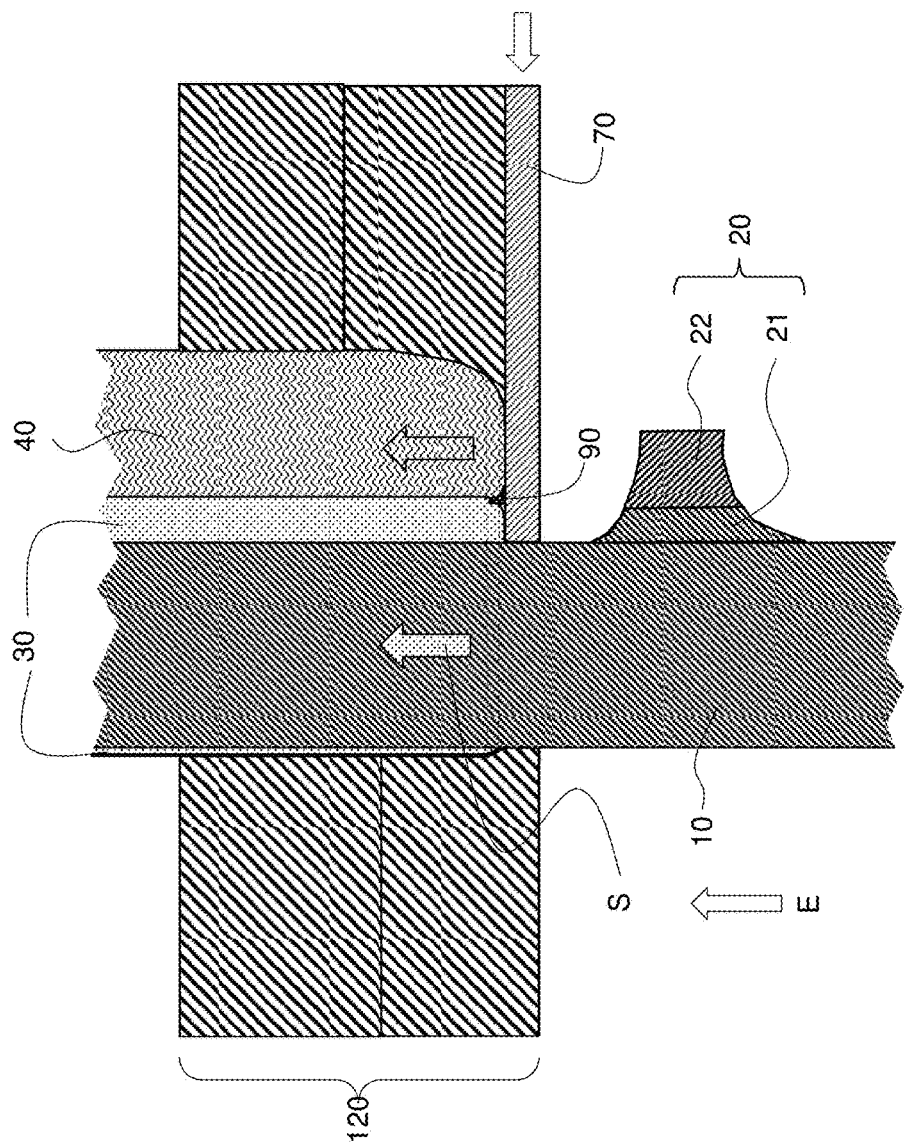
FIG. 19 shows another sectional view of an extrusion tool of another embodiment, consistent with disclosed embodiments.
Figure 20:
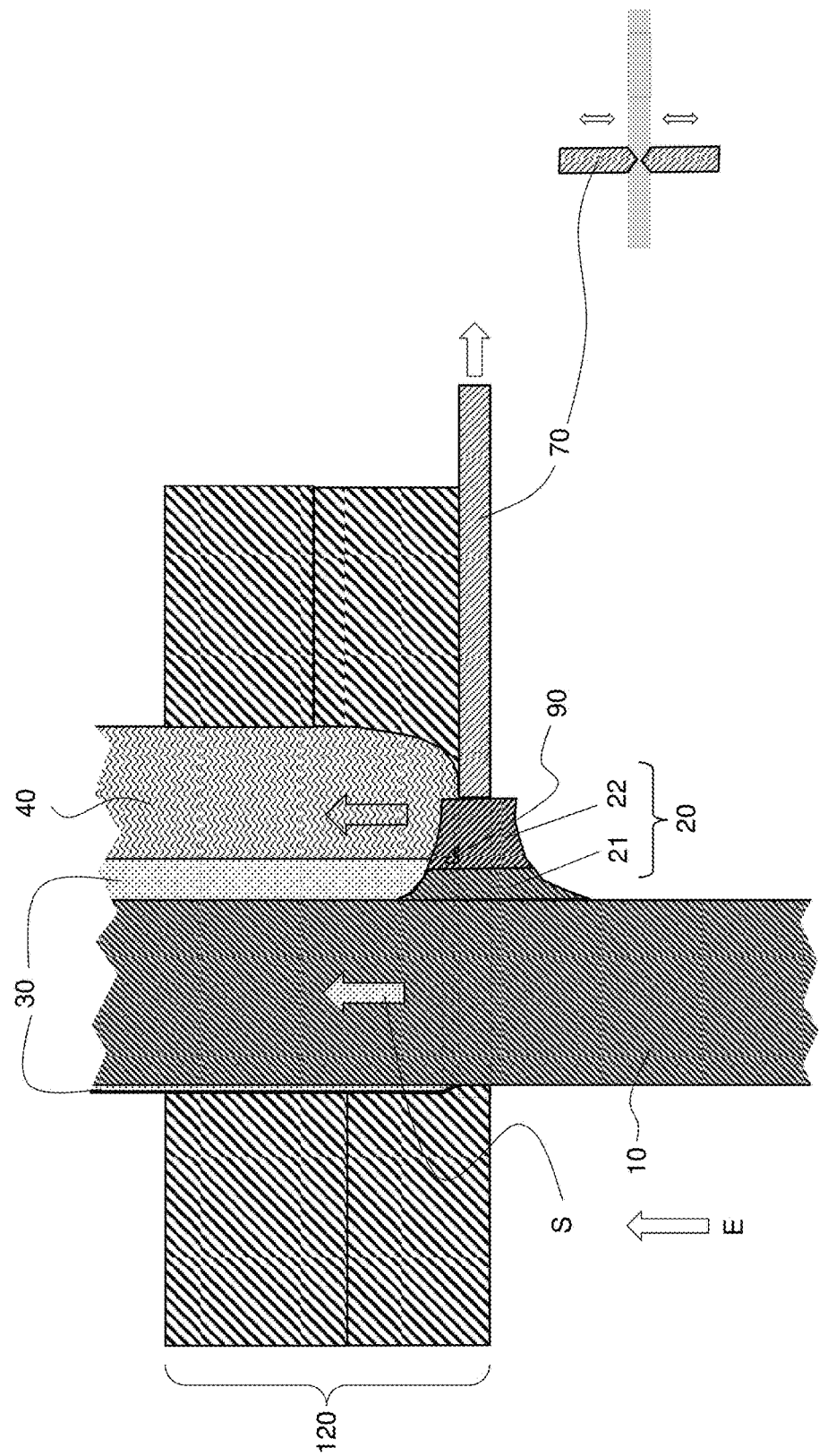
FIG. 20 shows another sectional view of an extrusion tool of another embodiment, consistent with disclosed embodiments.
Figure 21:
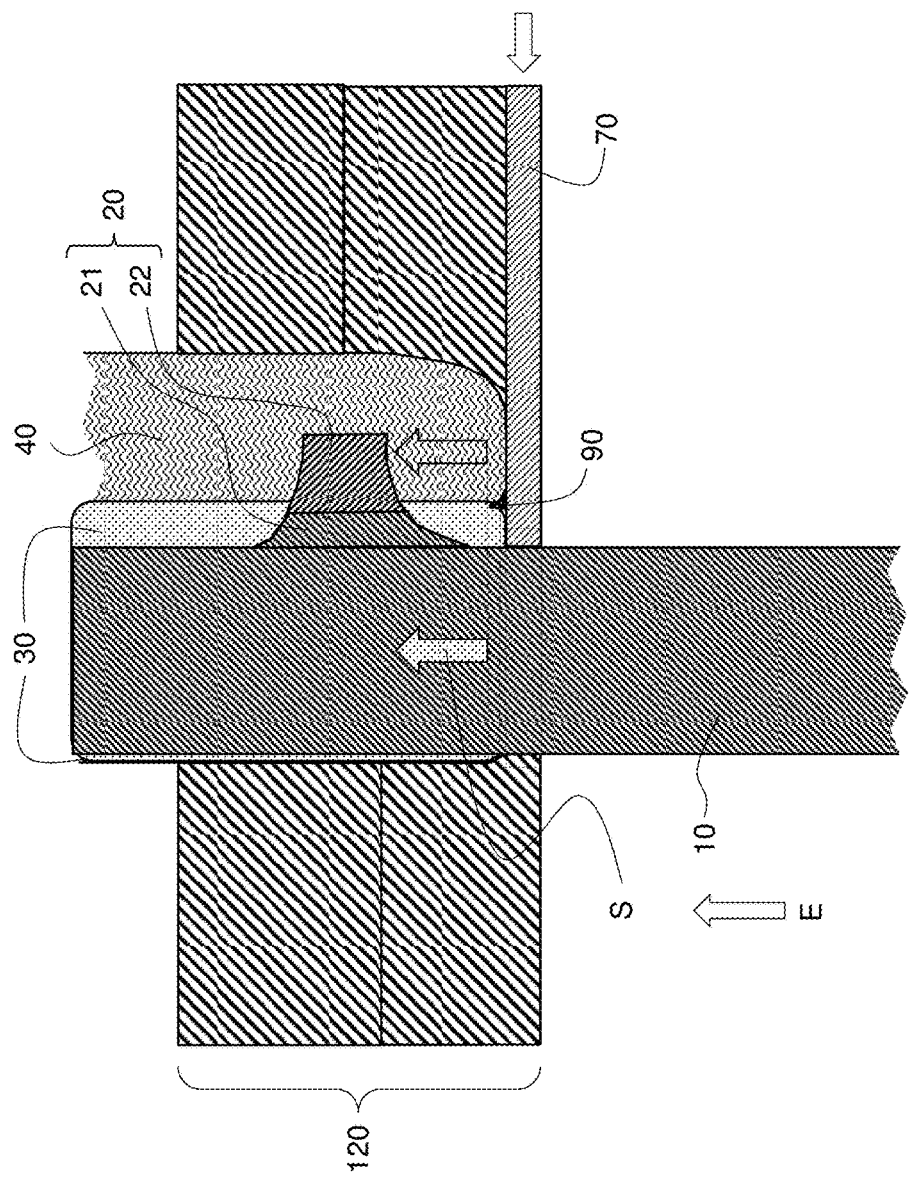
FIG. 21 shows another sectional view of an extrusion tool of another embodiment, consistent with disclosed embodiments.

With this embodiment, the melt-sealing system is opened and closed in a controlled fashion. This means that the disposal 20 is recognized by a control system, for example optically or mechanically, and an opening movement of the melt seal, such as a slide element 70, is initiated. After the disposal 20 enters into the extrusion tool 120, the control initiates the closure of the appropriate area. FIG. 17 shows an example of the opened state of the sealing slide system. FIG. 18 shows the closed state. FIGS. 19, 20, and 21 show sectional top views including the opening/closing process even clearer.

When the slide element 70 is arranged horizontally, the path to be sealed between the tool 120 and main profile body 10 may increase. In this example, the disposal 20 may be geometrically adapted depending on the path as a function of the rate of feed, as shown in FIGS. 19, 20, and 21. This controlled locking system may allow the seal opening to not create any mechanical stress at the lateral disposals 20. FIG. 17 shows the extrusion tool 120 with controlled melt-sealing slide elements 70 as sectional representation at the level of the advance of the second synthetics component 40 when the melt-sealing slide elements 70 are open. Two slide elements 70 are provided here. FIG. 18 corresponds to the embodiment depicted in FIG. 17, with the melt-sealing slide elements 70 being closed. FIG. 19 shows a horizontal arrangement of a controlled slide element 70 as a sectional top view of the flat conductor 10 from above. Here, the disposal 20 is developed with a lamella 21 and a contact tab 22, with the goal being a contour transition. FIG. 20 further illustrates the embodiment of FIG. 19, with the flat conductor 10 moving forward and having caused an opening of the slide element 70. FIG. 20 contains a small schematic representation that shows that the controlled slide element 70 can also be developed vertically. FIG. 21 shows a state where the flat conductor 10 has been advanced even further and the slide element 70 was closed after the lateral disposal 20 passed through.

In an embodiment, an energy director and/or guide element 90 may be inserted in the tool 120. The energy director and/or guide element 90 can guide the melt flow of the first synthetics component 30 and the second synthetics component 40 and/or separate the two components in the front inflow area of the cavity. This affects a specific feed of the two synthetics components relative to one another as well as to the main profile body 10 and the lateral disposal 20.

Another embodiment is shown in FIGS. 22, 23, 24, and 25. Here, the second synthetics component 40 is produced in advance, applied on the disposals 20 and guided along during the extrusion process, and then removed again. In this embodiment, the second synthetics component 40 is extruded separately or produced in another way and attached or plugged onto the lateral disposals 20. The already firm second synthetics component 40 seals in the extrusion tool 120 against melt of the first synthetics component 30 flowing out and forms a counter-wall to the first synthetics component 30.

Figure 22:
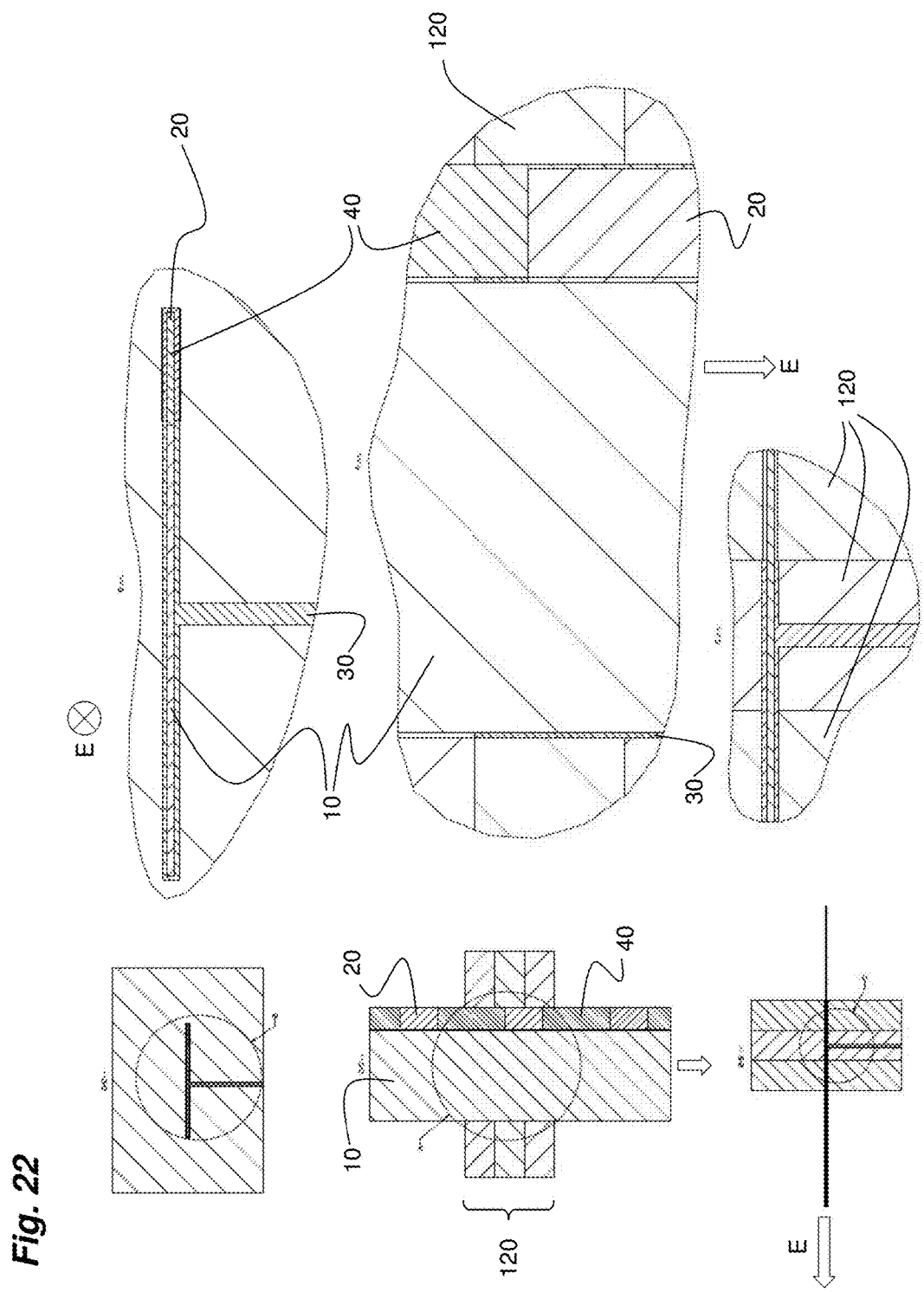
FIG. 22 shows an extrusion tool of another embodiment with external feed of the second synthetics component, consistent with disclosed embodiments.
Figure 23:
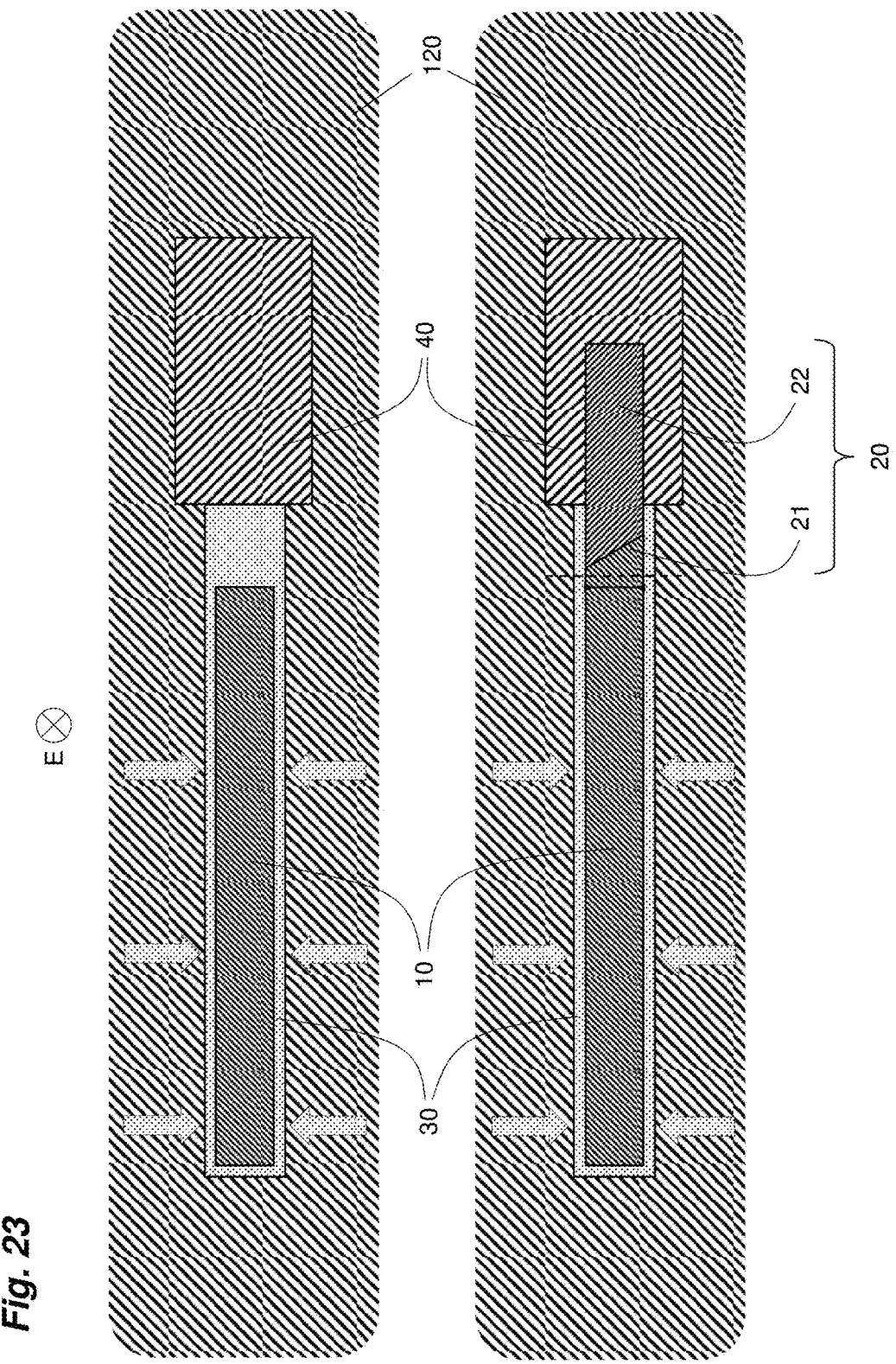
FIG. 23 shows another view of an extrusion tool of another embodiment with external feed of the second synthetics component, consistent with disclosed embodiments.
Figure 24:
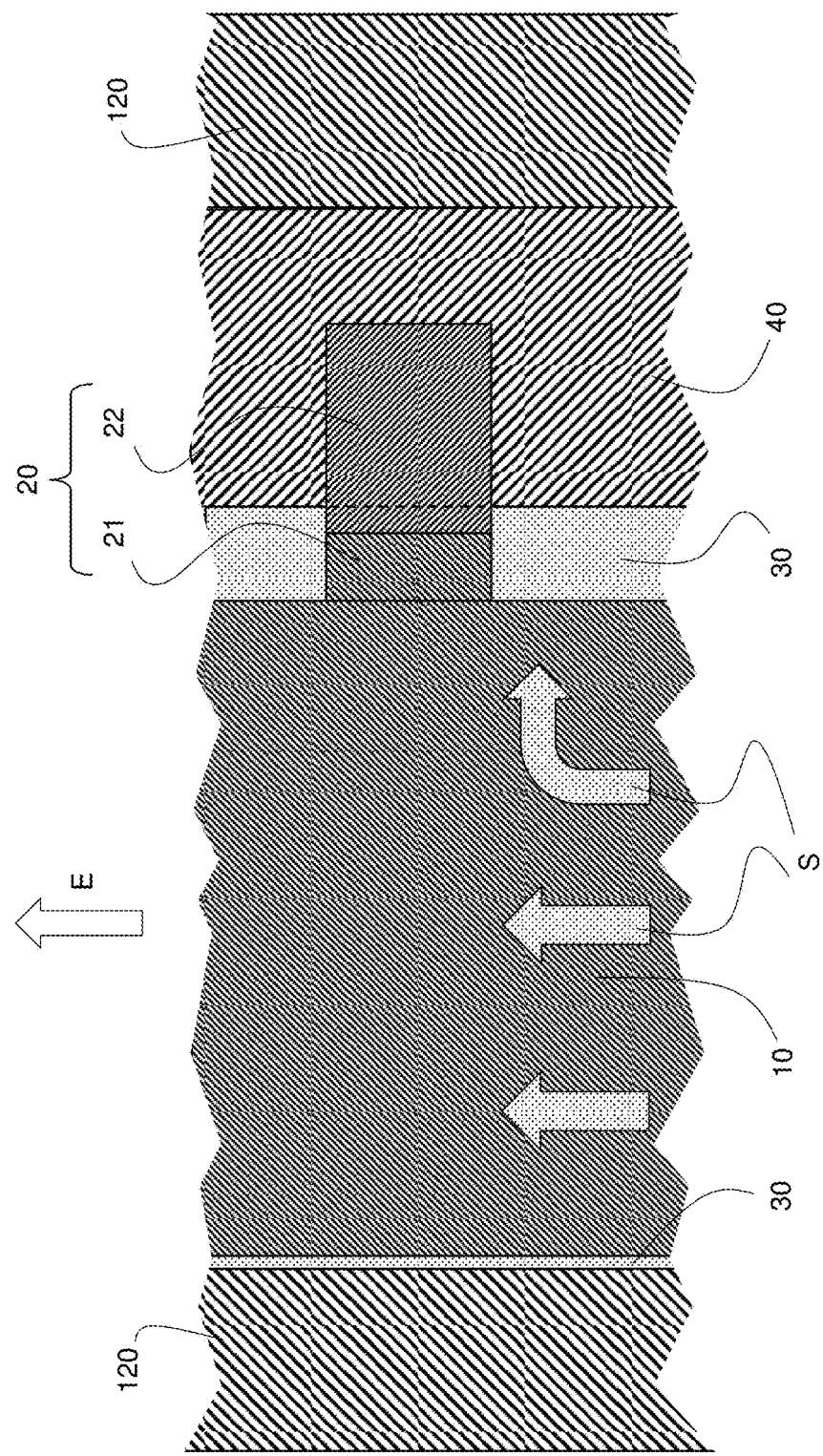
FIG. 24 shows another view of an extrusion tool of another embodiment with external feed of the second synthetics component, consistent with disclosed embodiments.
Figure 25:
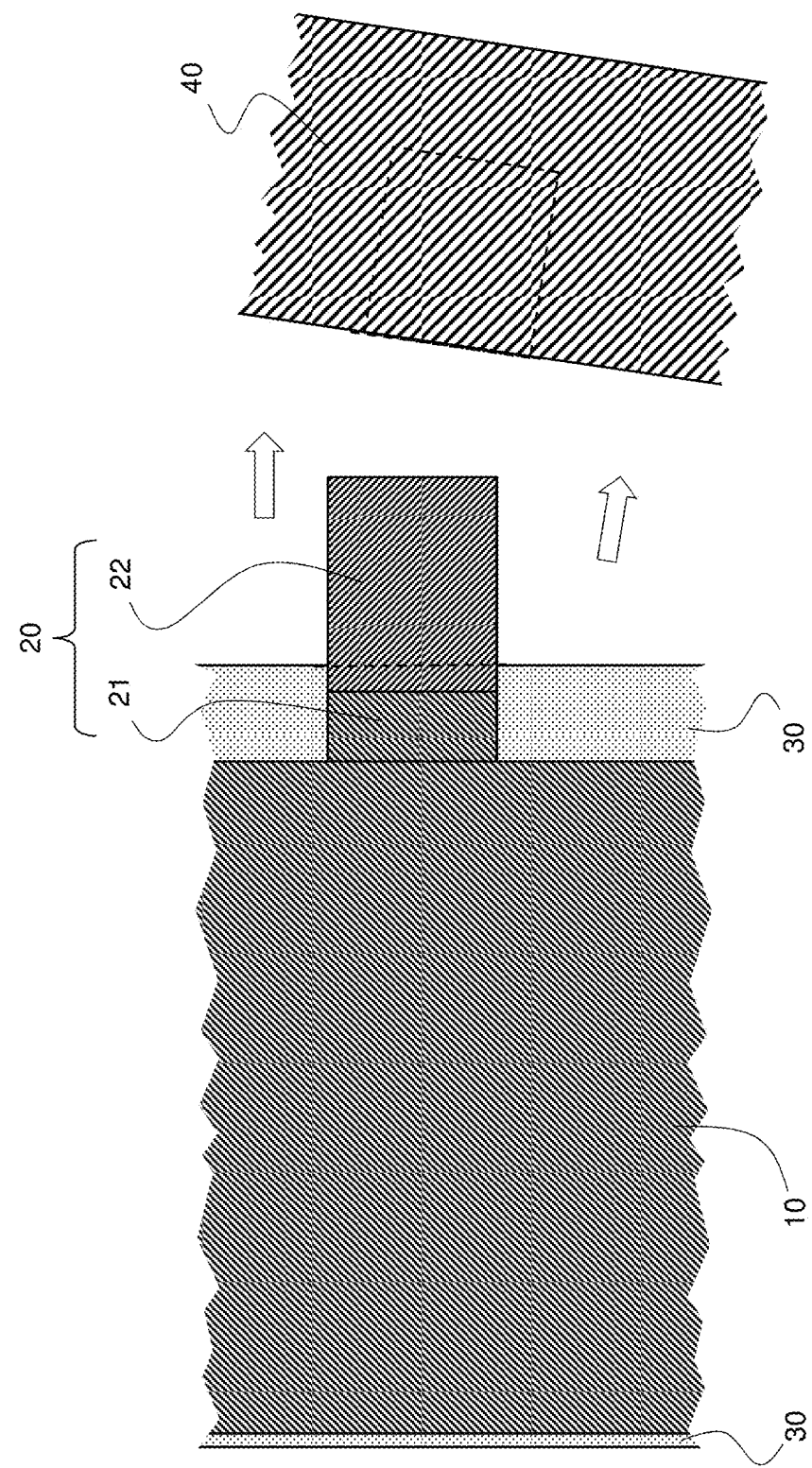
FIG. 25 shows another view of an extrusion tool of another embodiment with external feed of the second synthetics component with the sheathed profile outside of the tool and after removal of the second synthetics component, consistent with disclosed embodiments.

FIG. 22 shows an example of a potential tool structure 120 including the flat conductor 10. FIG. 23 schematically shows a modification of the embodiment from FIG. 22 as sectional representation in the tool 120, where the second synthetics component 40 was realized geometrically with greater wall strength. The passage in the extrusion tool 120 of the flat conductor 10 with contact tab 20 is shown as an example as a sectional drawing in the top views in FIGS. 24 and 25. In FIG. 24, the contact tab 20 that is carried along is in the extrusion tool 120. In FIG. 25, a state outside of the extrusion tool 120 is depicted, where the second synthetics component 40 was removed after the extrusion of the first synthetics component 30.

Figure 26:
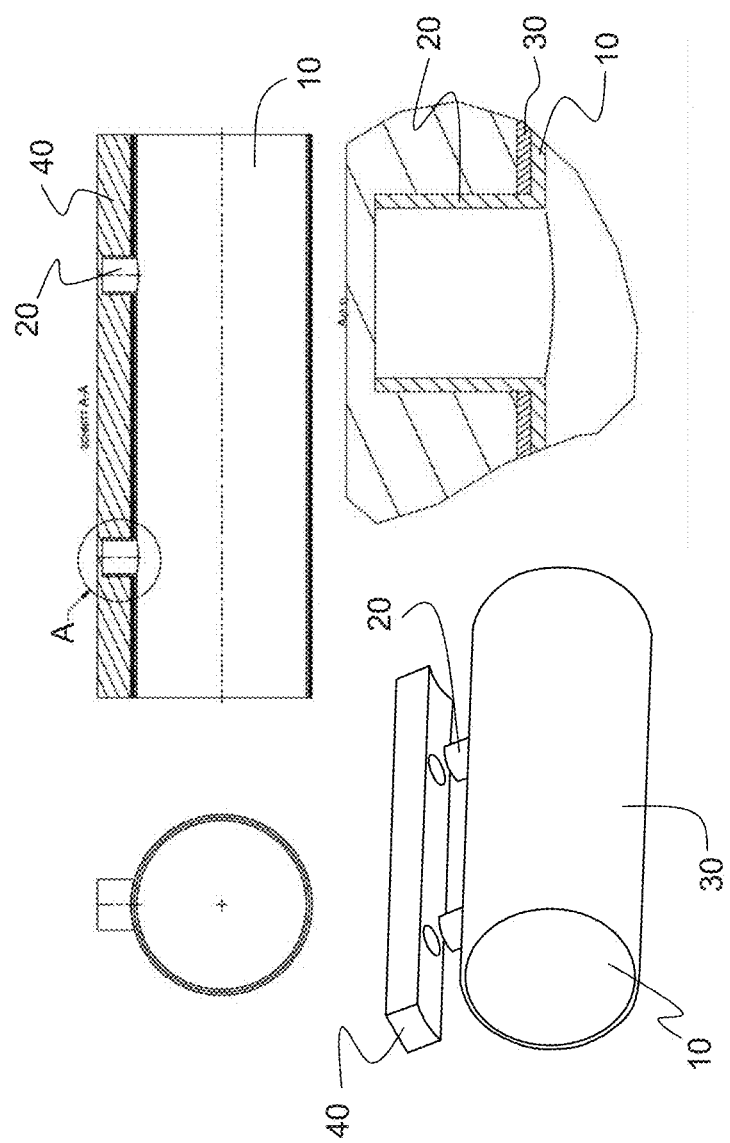
FIG. 26 shows a sheathed profile developed as a fluid-transporting tube, consistent with disclosed embodiments.

In addition to a line of electrical current, light guide, or for mechanical stabilization, disclosed embodiments may sheath a main profile body 10 that carries a fluid or medium. FIG. 26 shows the example of a tube with lateral open disposals 20. The openings of the lateral disposals 20 can be sealed with a plug prior to the extrusion so that the second synthetics component 40 cannot enter the hollow body. In an embodiment, the lateral disposals 20 can also be developed as closed tubes that are opened after extrusion, for example bored open.

In the processes shown here, the melting point pressures of the first synthetics component 30 and second synthetics component 40 may be adjusted to obtain a desired link to the main profile body 10 as well as at the disposals and a development of extrusion layers that are free of pores.

Although the disclosed embodiments may be discussed in relation to sheathing a one-layer or multi-layer flat conductor for the current supply in the automotive sector, the concept may be applied in very different fields. For example, alternative application areas may include transportation (e.g., aviation, space travel, shipping), engineering, furniture making, electrics and electronics (e.g., entertainment electronics), medical technology, building technology, structural engineering (e.g., drywall applications), and/or civil engineering (e.g., road engineering). The described processes may also be used to sheath window profiles such as the sealing lips or a roof rail, for example. In addition to the disclosed conductors, it is also possible to sheath non-electrically conducting profiles.

What is claimed is:

1. A method for sheathing an elongated profile part, the method comprising:
   providing the elongated profile part, wherein the elongated profile includes a main profile body and at least one disposal part;
   sheathing, at least partially, the main profile body with a first synthetics component, such that the first synthetics component is attached to the main profile body; and
   at least partially sheathing the at least one disposal part with a second synthetics component, such that the second synthetics component is attached to the disposal part,
   wherein the first synthetics component is adhesively bonded to the main profile body, such that the attachment between the first synthetics component and the main profile body is stronger than the attachment between the second synthetics component and the disposal part.

2. The method according to claim 1, wherein the first synthetics component is a self-adhesive synthetic material.

3. The method according to claim 1, wherein the first synthetics component is extruded fluidly on the main profile body, and at the same time, the second synthetics component is extruded fluidly on the at least one disposal part.

4. The method according to claim 1, wherein the main profile body and the at least one disposal part correspond to different portions of one piece made of the same material.

5. The method according to claim 1, wherein the main profile body and the at least one disposal part are made of different materials.

6. The method according to claim 1, wherein the at least one disposal part is partially sheathed with the first synthetics component so that a transitional area of the at least one disposal part, adjacent to the main profile body, is sheathed in the first synthetics component.

7. The method according to claim 1, wherein the main profile body is a conductor having at least one layer, and the at least one disposal part is a lateral contact tab coupled to the conductor.

8. A device for sheathing a longitudinal profile, comprising:
   a part having a passage for continuous throughput of the longitudinal profile, the passage having a cross-section corresponding to a cross-section of the longitudinal profile, wherein the longitudinal profile has a main profile body and at least one disposal part; and
   two extrusion nozzles, located in the passage, respectively having and feeding a first synthetics component and a second synthetics component, the two extrusion nozzles respectively feeding the first and second synthetics components to at least partially sheath the main profile body in the first synthetics component, such that the first synthetics component is attached to the main profile body,
   wherein the at least one disposal part is at least partially sheathed in the second synthetics component, such that the second synthetics component is attached to the disposal part, and
   wherein the first synthetics component is configured to bind to the main profile body, such that the attachment between the first synthetics component and the main profile body is stronger than the attachment between the second synthetics component and the disposal part.

9. The device according to claim 8, wherein the device has a seal that is forcibly opened when a disposal part enters the passage such that leakage of the first synthetics component and the second synthetics component is prevented.

10. The device according to claim 8, wherein the device has a moveable element which is openable and closeable via a control system when the at least one disposal part is inserted.

11. A sheathed elongated profile which has been sheathed using extrusion, comprising:
   a main profile body that is at least partially sheathed in a first synthetics component, such that the first synthetics component is attached to the main profile body; and
   at least one disposal part on the main profile body that is at least partially sheathed in a second synthetics component, such that the second synthetics component is attached to the disposal part;
   wherein the sheathing of the main profile body and the sheathing of the at least one disposal part are both applied in a single extrusion process, and
   wherein the first synthetics component is adhesively bonded to the main profile body, such that the attachment between the first synthetics component and the main profile body is stronger than the attachment between the second synthetics component and the disposal part.

12. The profile according to claim 11, wherein a clearance between the at least one disposal part and the main profile body is filled with the first synthetics component.

* * * * *